(12) United States Patent
Fukasawa et al.

(10) Patent No.: US 7,410,099 B2
(45) Date of Patent: Aug. 12, 2008

(54) APPARATUS AND METHOD FOR READING AND DECODING INFORMATION CONTAINED IN A BARCODE

(75) Inventors: Mika Fukasawa, Ichikawa (JP); Tatsuaki Wakabayashi, Yokohama (JP); Dai Kamiya, Tokyo (JP); Rika Kimura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 430 days.

(21) Appl. No.: 10/862,276

(22) Filed: Jun. 7, 2004

(65) Prior Publication Data

US 2005/0011958 A1     Jan. 20, 2005

(30) Foreign Application Priority Data

Jun. 5, 2003     (JP) .............................. 2003-161311

(51) Int. Cl.
*G06K 7/10*     (2006.01)
(52) U.S. Cl. ............... 235/462.09; 235/462.01; 235/472.01; 235/494
(58) Field of Classification Search .......... 235/462.25, 235/375, 462.01, 462.08, 462.09, 462.1, 235/462.46, 472.01, 494; 705/64
See application file for complete search history.

(56) References Cited

U.S. PATENT DOCUMENTS

| | | | | |
|---|---|---|---|---|
| 5,992,752 | A * | 11/1999 | Wilz et al. .............. | 235/472.01 |
| 6,561,428 | B2 * | 5/2003 | Meier et al. ............ | 235/462.25 |
| 6,786,412 | B2 * | 9/2004 | Shimizu ................. | 235/462.25 |
| 2003/0120555 | A1 * | 6/2003 | Kitagawa ..................... | 705/26 |
| 2003/0198383 | A1 * | 10/2003 | Yamaguchi et al. ......... | 382/183 |

FOREIGN PATENT DOCUMENTS

| | | |
|---|---|---|
| JP | 2000-348045 | 12/2000 |
| JP | 2000-348127 | 12/2000 |
| JP | 2003-50690 | 2/2003 |

OTHER PUBLICATIONS

Sharp, Mobile Phone, More Convenient and more fun to use! Barcode Reading and Generating Function, J-SH010, http://www.sharp.co.jp/products/jsh010/text/barcode.html, pp. 1.

* cited by examiner

*Primary Examiner*—Seung H Lee
(74) *Attorney, Agent, or Firm*—Michaud-Duffy Group LLP

(57) ABSTRACT

An image output device inputs content information, generates a barcode by encoding input content information, and outputs print data so that a sign visually indicating a property of the content information is printed adjacent to the generated barcode or by superimposing the sign on the generated barcode.

22 Claims, 21 Drawing Sheets

FIG. 4

BOOKMARK REGISTRATION

TITLE

URL   HTTP://www.***.com

FIG. 5

REGISTER BOOKMARK?

YES    NO

FIG. 7

| Telephone Directory Registration | Mail To | Bookmark Registration | | Setting |

Name: 清水****

TEL: 090******** e-mail:

Memo:

IG1

B1
[GENERATE]

BARCODE SIZE
● SMALL
○ MEDIUM
○ LARGE

FIG. 8

| Telephone Directory Registration | Mail To | Bookmark Registration | | Setting |

TO: *@**.com

TITLE: OPEN THE SESAME

TEXT: I WOULD LIKE TO HAVE A SERVICE PROVIDED. MY TELEPHONE NUMBER IS AS FOLLOWS:

IG2

B1
[GENERATE]

BARCODE SIZE
● SMALL
○ MEDIUM
○ LARGE http://www.xyzcompany.com/EN/?Age=3&Sex=f http://www.xyzmarket.com/JP/buy?num=123&c=xxx-credit

APPARATUS AND METHOD FOR READING AND DECODING INFORMATION CONTAINED IN A BARCODE

CROSS-REFERENCE TO RELATED APPLICATIONS

This application is entitled to the benefit of and incorporates by reference essential subject matter disclosed in Japanese Patent Application No. 2003-161311 filed on Jun. 5, 2003.

FIELD OF THE INVENTION

The present invention relates to technique for providing information using a barcode.

BACKGROUND OF THE INVENTION

Both one and two-dimensional (2-D) barcodes are known. The latter are used to encode relatively large amounts of information in the form of a character string. This information can then be provided to a recipient in the form of a printout or other communication means.

Information encoded in a 2-D barcode (hereinafter "content information") is decoded using a decoding device. Such a device may be a mobile station provided with a digital camera, and having a function of decoding content information encoded in a 2-D barcode. Such a system is disclosed, for example, in "J-SH010" (Sharp Corporation, http://www-.sharp.co.jp/products/jsh010/text/barcode.html, May 27, 2003).

According to the disclosed Sharp mobile station a user operates the station's digital camera to read a 2-D barcode from a printed object, and content information encoded in the barcode is then decoded. When particular character strings are detected in the 2-D barcode, the mobile station is caused to execute corresponding particular processes. For example, detected content information "MEMORY:" causes the mobile station to register in its telephone directory content information present in a character string that follows "MEMORY:" such information may include, for example, a name, telephone number, Email address, and so on.

A problem exists with this system, however, in that content information are not standardized for use among different types or makes of mobile stations. Thus, depending on a format of content information encoded in a 2-D barcode, a mobile station may or may not be able to process the content information. The easiest solution to this problem would be to standardize formats of content information for use in 2-D barcodes with mobile stations. However, this is unlikely to happen since vendors of such stations wish to differentiate their products.

A further inconvenience caused by this incompatibility problem is that it is difficult for a user of a mobile station to visually distinguish a format used for content information merely by looking at a 2-D barcode. As a result, the user may waste time reading with a mobile station a 2-D barcode having encoded content information which cannot be properly processed by his/her mobile station. Moreover, the user is unable to know whether the encoded content information can be processed by his/her mobile station until the read operation of the barcode is complete. This acts as a disincentive to users attempting to obtain content information with their mobile stations utilizing the barcode system.

Further, even if content information can be successfully processed by a user's mobile station and the user is able to acquire desired information, the acquired information is sometimes not utilized by the user. For example, when a vendor posts an advertisement poster, on which a barcode is printed, a user can access general information provided by the vendor by using the information contained in the barcode, but the information may not match the user's needs. In such a case, it would be more effective if user-oriented information suited to a user's preferences could be accessed by use of information contained in a barcode. However, it is impractical to print as many barcodes as the number of variations of users' preferences on an advertisement poster or in a catalog. Further, it would be troublesome for a user to find a barcode suited to his/her preferences from among a number of printed barcodes. Thus, it has been difficult to provide information suited to the needs of a user by means of a barcode.

SUMMARY OF THE INVENTION

The present invention has been made in view of the problem described above, and its object is to provide a technique that prevents redundant reading of a barcode image that cannot be processed by a mobile station due to incompatibility. The technique also enables effective provision of information using barcode images.

The present invention provides an image output device comprising: input means for inputting content information; encoding means for generating a barcode by encoding the content information input by the input means; and output means for outputting data, so that a sign visually designating a property of the content information input by the input means is printed or displayed adjacent to the barcode generated by the encoding means.

In a preferred embodiment, the image output device may be configured so that a user is able to designate a sign or indicator. In another preferred embodiment, the image output device may be configured to generate data for output so that more than one sign or indicator, each of which designates a different property of the content information, can be displayed or printed adjacent to the barcode. Instead of displaying or printing a sign adjacent to the barcode, the image output device may be configured to generate a composite image by compositing a barcode and a sign that designates a property of content information encoded in the barcode.

According to the present invention, a mobile communication terminal is provided, which has an input means for inputting content information; encoding means for generating a barcode by encoding content information input by the input means; and generating means for generating data for output so that the output data contains a sign visually representing a property of the content information input by the input means is printed or displayed adjacent to the barcode generated by the encoding means. The present invention further provides a program for causing a computer to execute processes implemented by the input means, the encoding means, and the generation means of the mobile communication terminal. Still further, the present invention provides a printed object with a sign visually representing a property of content information being printed adjacent to a barcode obtained by encoding the content information.

Preferably, the content information generated by the image output device, the mobile communication terminal, or the program, or that printed in the printed object contains information relating to a provider of related information. More preferably, the content information contains a plurality of location identifiers representing candidate providers of related information, and each of the plurality of location identifiers is correlated with user attribute information. In the mobile communication terminal, user attribute information of a user of the terminal is stored, and a location identifier of a provider of related information that matches the user attribute information is selected from among the plurality of location identifiers contained in the content information.

According to the present invention, a sign visually representing a property of input content information is printed or displayed adjacent to a barcode generated by encoding the content information. In a preferred embodiment, a composite image of a barcode and a sign is printed or displayed. Thus, redundant reading operation of a barcode containing incompatible content information is avoided. Also, various properties of a barcode may be signified since a sign for use can be designated, or a plurality of signs can be printed or displayed. Further, since a barcode contains information relating to an information provider according to user attributes, information that matches preferences of a user can be provided via the barcode printed on a paper and then by an information providing device.

BRIEF DESCRIPTION OF THE DRAWINGS

FIG. 4 is a diagram showing an example of a display screen of a mobile station 6 in the system.

FIG. 5 is a diagram showing an example of a display screen of mobile station 6 in the system.

FIG. 7 is a diagram showing an example of a display screen of image output device 1.

FIG. 8 is a diagram showing an example of a display screen of image output device 1.

DETAILED DESCRIPTION OF PREFERRED EMBODIMENTS

Figure 1:
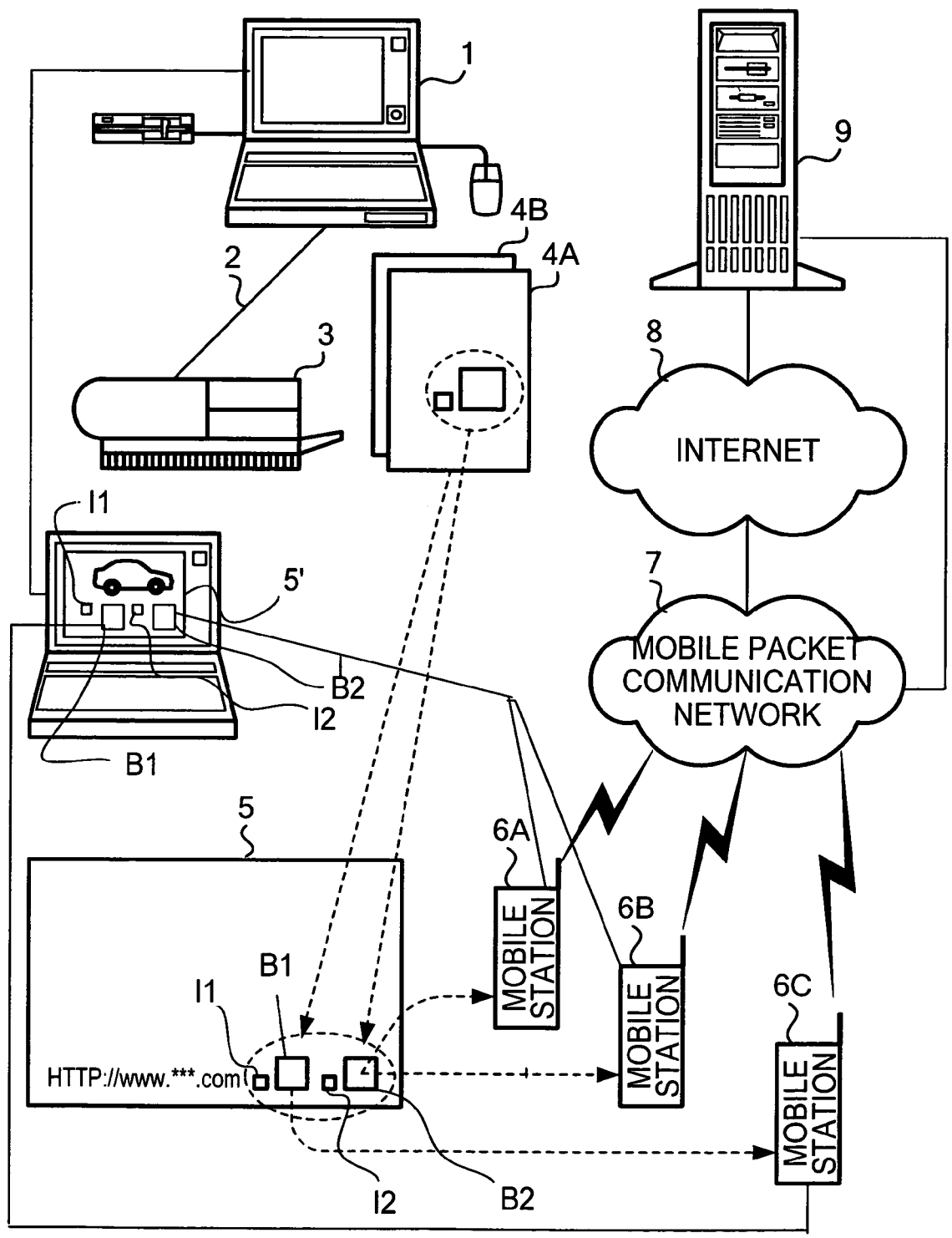
FIG. 1 is an example diagram showing an information distribution system using an image output device 1 according to a first embodiment of the present invention.

In the following, embodiments of the present invention will be described with reference to the attached drawings. In the drawings, like reference numerals are used for like components.

The first embodiment of the present invention is shown in FIG. 1 which is a diagram illustrating an example of information distribution using image output device 1 according to a first embodiment of the present invention. As shown in the figure, a printer 3 is connected to image output device 1 via a USB (Universal Serial Bus) cable 2. Mobile stations 6A-6C each are capable of performing packet communication, with a server 9 via mobile packet communication network 7 either directly or via the Internet 8.

Mobile stations 6A and 6B each are capable of reading a 2-D barcode, and are provided with a function of decoding content information from the read 2-D barcode data; and are also capable of recognizing content information when such content is written in Format A. Mobile station 6C is capable of reading a 2-D barcode, and is provided with a function of decoding content information from the read 2-D barcode data; and is also capable of recognizing content information written in Format B. Mobile stations 6A-6C have identical functions insofar as processing of the 2-D barcode is concerned. However, mobile stations 6A and 6B recognize a different format from that recognized by mobile station 6C.

In the following description, as applicable, mobile stations 6A-6C will be collectively referred to as mobile station 6. Mobile station 6 has a telephone directory registration function, a "write new mail" function, and a bookmark registration function, as are commonly provided in mobile phones capable of accessing web sites. Mobile station 6 is capable of transferring content information to its "telephone directory function" when the content information is recognized to be for "telephone directory registration"; of transferring the information to its "write new mail function" when the information is recognized to be for "mail to"; and to its "bookmark registration function" when the information is intended for "bookmark registration".

In the information distribution system shown in FIG. 1, image output device 1 operates in response to operations performed by an advertiser as follows. That is, image output device 1 writes an input URL and title as content information in Format A; encodes the content information to generate a 2-D barcode; and generates print data (output data) based on the 2-D barcode; and a sign designating Format A. Image output device 1 then outputs the print data to a printer 3 via USB cable 2. Image output device 1 also performs the same process for Format B.

Figure 2:
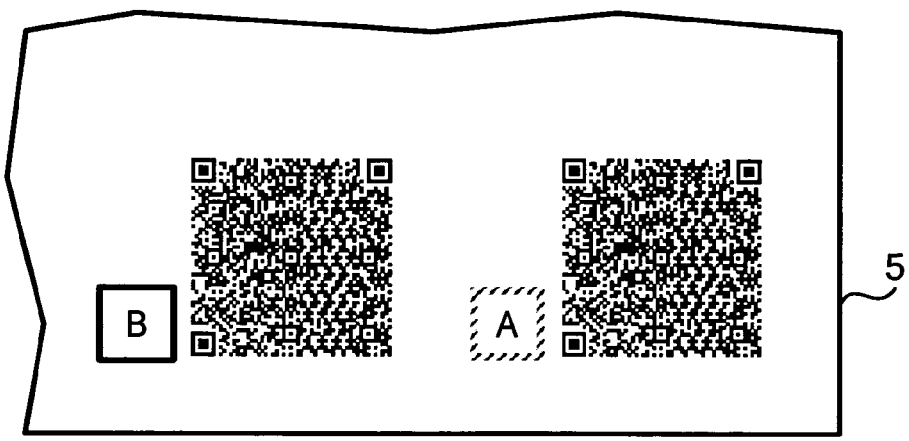
FIG. 2 is an example diagram showing a portion of an advertisement poster 5 generated in the system.
Figure 3:
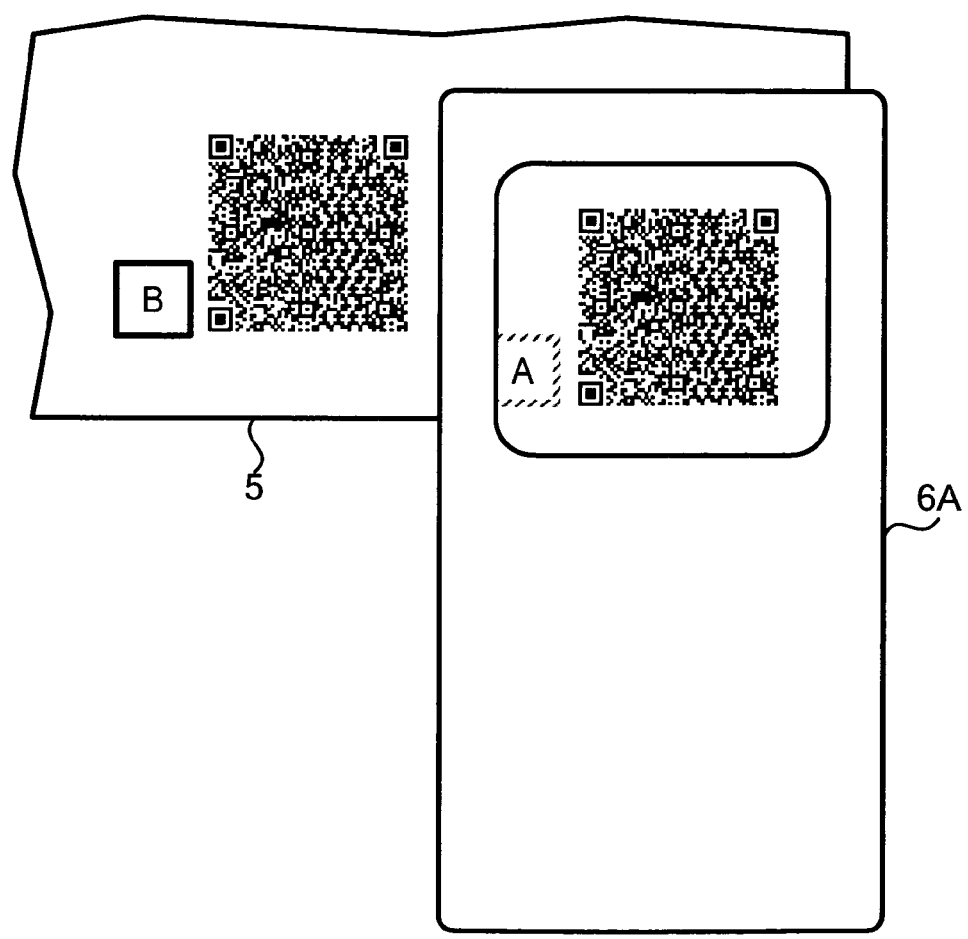
FIG. 3 is an example diagram showing how a barcode is being read from advertisement poster 5.

As a result, paper 4A with a printout of the 2-D barcode indicated by "B1" and the sign or indicator for Format A denoted by "I1", and paper 4B with a printout of the 2-D barcode indicated by B2 and the indicator "I2" for Format B are ejected from printer 3. These 2-D barcodes and corresponding signs are printed on an advertisement poster consisting of a single paper sheet, along with a character string showing the URL. The printed advertisement poster 5 can then be posted in an advertisement space on a street, shop window, and the like. While advertising posters are shown and described, the present invention is not limited in this regard as other advertising media can also employ the above-described barcode and other indicating indicia. For example, the advertisement can be displayed electronically instead of documentarily, as indicated in FIG. 1 as display 5' on such media as electronic billboards, television and computer screens, and the like. Such an electronic advertisement would also include the barcodes In the current example, a user of a mobile station 6A, which station is capable of processing data in Format A, passes the advertisement space, notices advertisement poster 5, and wishes to obtain more detailed information about an advertised product. The user locates a sign for Format A from advertisement poster 5 (refer to FIG. 2), and operates his/her mobile station 6A to read the 2-D barcode paired with its corresponding sign (refer to FIG. 3). Mobile station 6A decodes content information from the 2-D barcode. Since the decoded content information is written in Format A, mobile station 6A informs the user that the content information can be transferred to its bookmark registration function (refer to FIG. 4); and upon confirmation by the user, mobile station 6A transfers the content information to the bookmark registration function (refer to FIG. 5).

The user inputs an instruction for accessing a web site using the registered bookmark. Mobile station 6A sends a URL for the registered bookmark to mobile packet communication network 7. As a result, a communication connection is established between mobile station 6A and web server device 9, which communication is performed via mobile packet communication network 7 and the Internet 8. Web server device 9 stores in its memory detailed information on the product advertised on advertisement poster 5. Accordingly, the user is now able to obtain detailed information on the product of interest.

Figure 6:
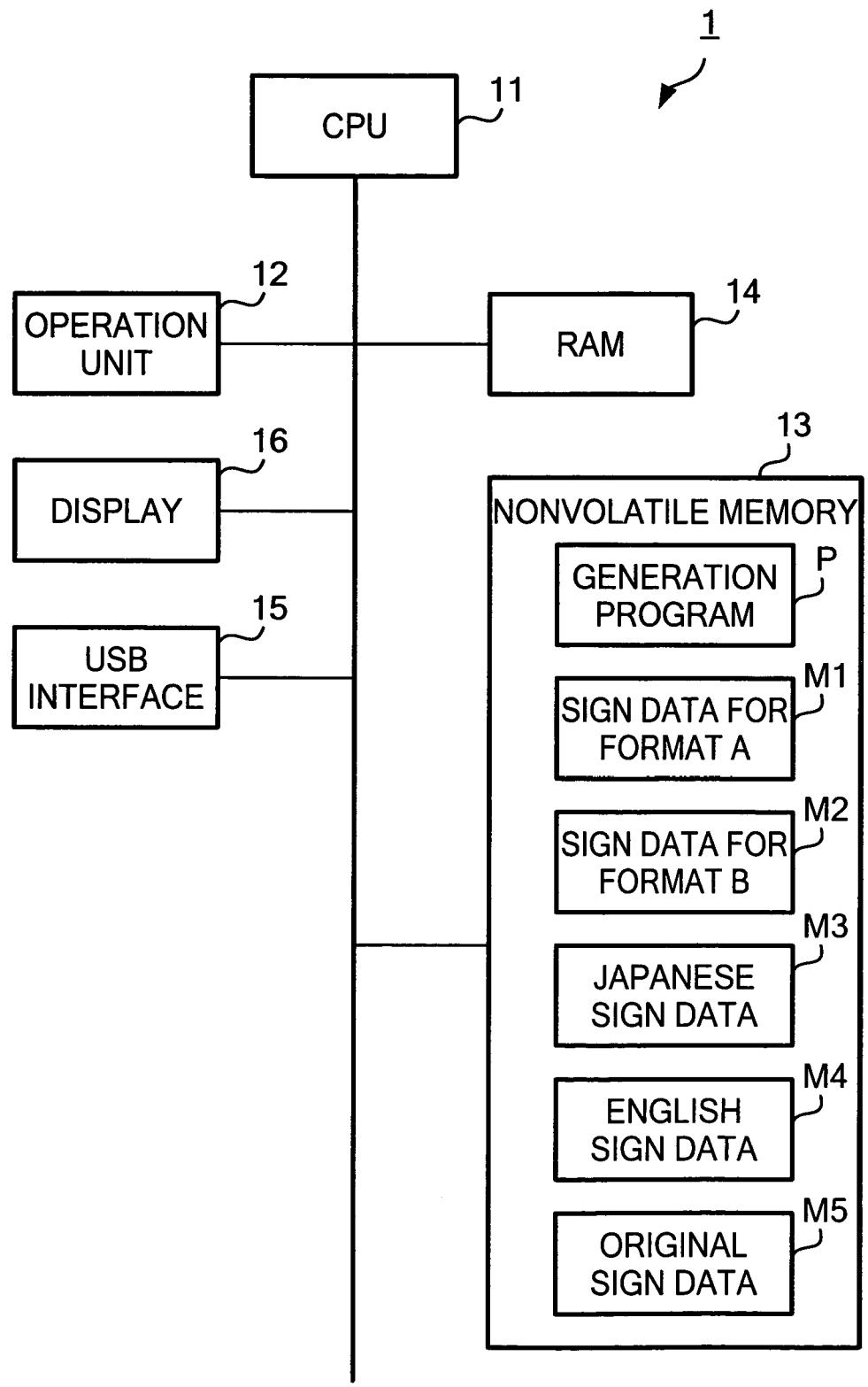
FIG. 6 is a block diagram showing a configuration of image output device 1.

As shown in FIG. 6, an image output device 1 according to the present embodiment has adjacently the same hardware configuration and operating system as a general notebook computer does. In the following, it is assumed that the operating system has already been started in image output device 1.

A CPU 11 receives an operation signal from an operation unit 12 having operation keys and the like, and executes a command contained in the received operation signal. In a case that the command is for execution of a program stored in a nonvolatile memory 13, CPU 11 assigns a RAM 14 as a work area, reads the program from nonvolatile memory 13, and executes the program. CPU 11 also follows the command given by the program that is being executed; and reads or writes data from or into nonvolatile memory 13 and RAM 14; outputs data through a USB cable 2 via a USB interface 15; or supplies image data to a display 16. USB interface 15 is one example only, and any appropriate interface can be used for transmission of data to a printer device such as printer 3. Such an interface may be a writing device for writing data onto a portable recording medium that can be read by the printer device.

In nonvolatile memory 13, sign data M1-M5 are stored, where the sign represents a property of content information. The term "property of information" covers various attributes of the information such as: a volume the information; a format of the information; a language in which the information is written; a source of the information; applications of the information; a type or version of a 2-D barcode used for encoding the information; and a pitch between symbols comprising the 2-D barcode which is obtained in encoding the information. Sign data M1 for Format A signifies to a viewer Format A; Sign data M2 for Format B signifies to a viewer Format B; Japanese sign data M3 signifies the Japanese language; and English sign data M4 signifies the English language. For example, a mark that suggests a service provided by a vendor of a mobile station using Format A or an operator of a mobile communication network using Format A may be used as a sign indicating Format A. Original sign data M5 comprises optional image data prestored by a user in nonvolatile memory 13 of image output device 1. Accordingly, this prestored image data represents a property of content information that cannot be represented by any of the sign data M1-M4.

Nonvolatile memory 13 also stores a generation program P for causing image output device 1 to sequentially execute each of: an input process; an encoding process; an output process; processes for generating a 2-D barcode; and processes for generating a sign for use with the barcode. The generation program P is designed so as to execute, depending on a situation, a designated output process, a multiple output process, and a composite output process, in place of the output process. When causing execution of the designated output process, program P is designed to execute a designation process beforehand. When causing execution of the composite output process, the program P is designed to execute a composite process beforehand.

The input process is a process of inputting content information, and the encoding process is a process of generating a 2-D barcode by encoding content information. The output process is a process of outputting print data such that a sign representing a property of the content information is printed adjacent to the 2-D barcode. The multiple output process is a process of outputting print data so that multiple signs representing properties of the content information are printed adjacent to the 2-D barcode. In the designation process a user of image output device 1 designates a sign representing a property of the content information. The designated output process is a process of outputting print data whereby the designated sign is printed adjacent to the 2-D barcode. The composite process is a process of generating a composite image by compositing the 2-D barcode and a sign representing a property of the content information. The composite output process is a process of outputting print data for printing the composite image.

In CPU 11 the generation program P is run, that is, CPU 11 reads the generation program P from nonvolatile memory 13 for execution, thereby providing image output device 1 with an input means, a designation means, an encoding means, a composite means, an output means, a designated output means, a composite output means, and a multiple output means.

Figure 9:
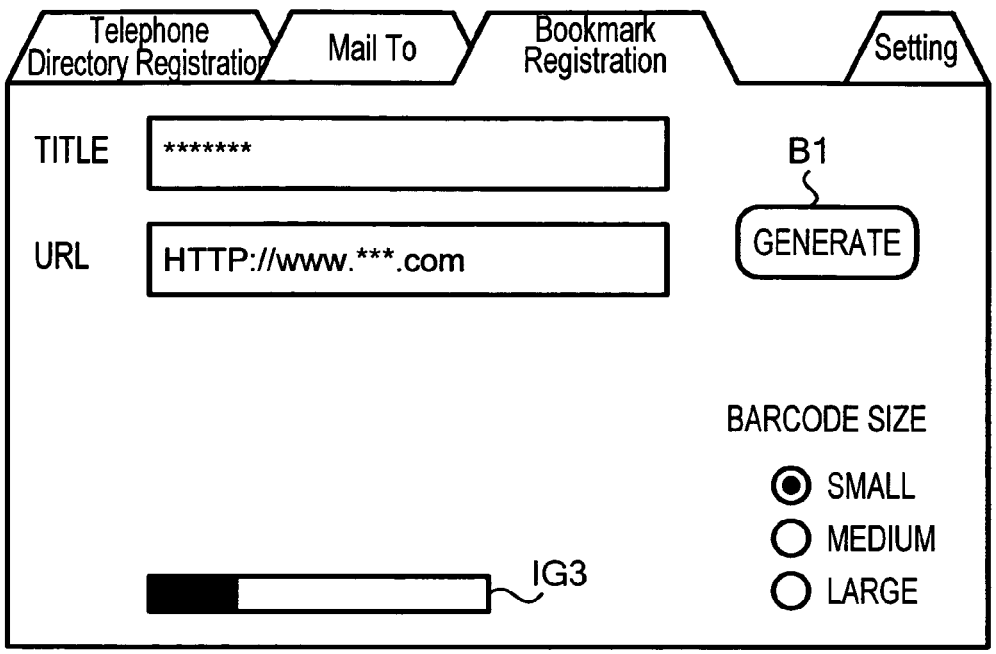
FIG. 9 is a diagram showing an example of a display screen of image output device 1.

CPU 11, by means of the generation program P, when it receives an operation signal from operation unit 12, causes a display 16 to display one of the screens shown in FIG. 7-9, thereby prompting a user to input content information. CPU 11, upon receiving an operation signal from operation unit 12, determines whether the received operation signal represents the content information. When it is determined YES, CPU 11 causes RAM 14 to store the content information after correlating the content information with the screen that is being displayed. At this time, CPU 11 updates an image of an indicator IG1, IG2, or IG3 shown on the screens on the basis setting information (described later). These indicators are independent for each screen, and each indicator visually shows a ratio of free storage space in proportion to an information capacity for a 2-D barcode to be created. As described later, content information is converted to a character string according to the setting information, and the above ratio changes depending on how a barcode and a sign are generated. Thus, CPU 11 calculates the ratio by taking the setting information into consideration.

As clear from the above description, the input means comprises CPU 11, nonvolatile memory 13, operation unit 12, RAM 14, and display 16. In a modification where content information is input by receiving information that has been transmitted from a terminal having an operation unit and a display (hereinafter referred to as "Modification 1"), the input means additionally comprises a communication unit for performing communication with the terminal, but operation unit 12 and display 16 are no longer required as components of the input means.

CPU 11 uses the generation program P, and on the basis of an operation signal from operation unit 12, causes display 16 to display the screens shown in FIGS. 7 to 10, thereby prompting a user to input information for determining a format used for encoding, setting information on how to handle a sign, and a value of a pitch used in the 2-D barcode. Upon receiving an operation input from operation unit 12, CPU 11 determines whether the operation signal represents setting information, and in a case that it is determined that the operation signal appropriately represents setting information, CPU 11 stores in RAM 14 data represented by the operation signal as the setting information. Following are examples of the handling of a sign that can be prescribed in the setting information, the input of which is prompted by the screen shown in FIG. 10: the size of a 2-D barcode (large/medium/small);
  whether to print a sign;
  the number of signs to be printed when printing a sign(s) (one/two);
  whether to use one of sign data M1-M4 when printing a sign(s) (designating means);
  which sign data M1-M4 is used when using one of sign data M1-M4 (designating means);
  which format is used (Format A or B);
  what sign data is used when no sign data M1-M4 is used (designating means);
  when the number of a sign to be used is one, what kind of arrangement pattern is used to arrange a sign and a 2-D barcode image (side or composite);
  when the arrangement pattern is "composite", which composite method is used (blank or transparent); and
  when the arrangement pattern is "transparent", whether to use automatic correction.

Figure 10:
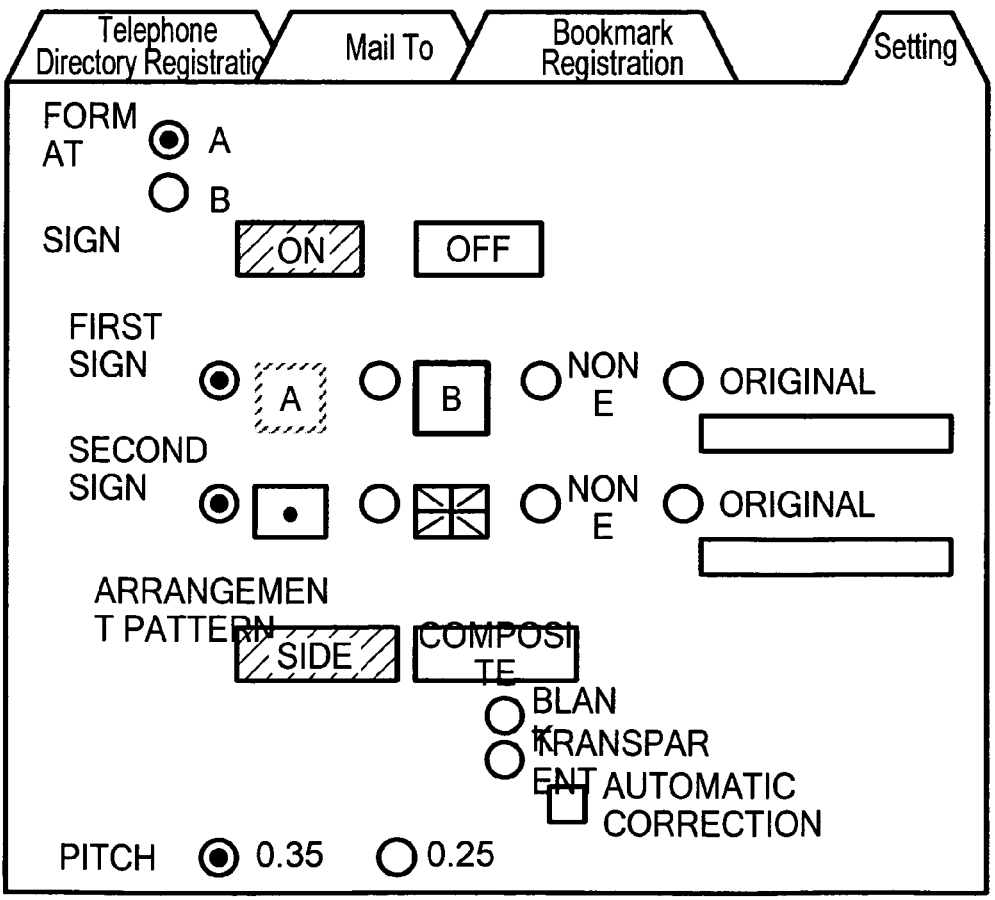
FIG. 10 is a diagram showing an example of a display screen of image output device 1.

An inappropriate operation signal includes a signal that causes a conflict. For example, those inappropriate signals are a signal for selecting sign data M2 for Format B when Format A is selected as a format to be used for encoding, and a signal for selecting sign data M1 for Format A when Format B is selected. When such an inappropriate signal is received, CPU 11 changes the setting information stored in RAM 14 so that no conflict is induced. That is, the latest operation signal overrides earlier settings to prevent conflict. The screen shown in FIG. 10 is a screen designating setting information stored in RAM 14; the information shown on the screen comprise changes made to setting information stored in RAM 14.

As clear from the above description, the designating means comprises CPU 11, nonvolatile memory 13, operation unit 12, RAM 14, and display 16. In Modification 1, the designating means further comprises a communication unit for communicating with the terminal, in place of operation unit 12 and display 16.

CPU 11, by means of the generation program P, converts the content information stored in RAM 14 into a character string in a format prescribed in the setting information stored in RAM 14. CPU 11 then encodes the character string according to a predetermined encoding method, thereby generating a 2-D barcode comprising a light portion and a dark portion, and stores in RAM 14 2-D barcode data representing the 2-D barcode.

As clear from the above description, the encoding means comprises CPU 11, nonvolatile memory 13, and RAM 14.

Output means, designated output means, composite means, composite output means, and multiple output means:

CPU 11, by means of the generation program P, performs an arrangement process for obtaining print data according to the setting information stored in RAM 14. The details of the arrangement process depend on the details of the setting information except for that CPU 11 determines an image size on the basis of a pitch and a barcode size prescribed in the setting information stored in RAM 14.

1: Printing No Sign:

CPU 11 adds data designating the image size to the 2-D barcode data stored in RAM 14, thereby generating print data. Subsequently, CPU 11, after confirming the intention of the user of image output device 1, transmits the generated print data to printer 3 through USB interface 15, records the data in nonvolatile memory 13, or abandons the data. Printer 3, when it receives the print data, prints a 2-D barcode on a paper in the above image size.

2: Printing a Sign:

2-1: Printing One Sign to One Side of Barcode

CPU 11 creates print data by adding to the 2-D barcode data stored in RAM 14, sign data defined in the setting information stored in RAM 14, data designating an image size, data designating positional relationship, on a printed object, between an image represented by a 2-D barcode data and a sign represented by the sign data (designated data output means, output means). The positional relationship is defined so that the sign is close to the 2-D barcode, with enough space being reserved around the 2-D barcode for enabling proper recognition of the barcode. Further, CPU 11 causes display 16 to display a screen prompting the user to input instructions as to how to handle the created print data. When, as a response, receiving operation signal from operation unit 12, CPU 11 follows an instruction represented by the operation signal to transmit the print data to printer 3 via USB interface 15 (designated output means, output means), to store the print data in nonvolatile memory 13, or to abandon the data. Printer 3, when it receives the print data, prints, on the printing paper, a 2-D barcode and a sign represented respectively by a 2-D barcode data and sign data included in the print data, in an image size and in positional relationship represented by data designating the image size and data designating the positional relationship included in the print data.

As is clear from the above description, designated output means comprises CPU 11, nonvolatile memory 13, RAM 14, and USB interface 15.

2-2: Printing One Sign Composited with a 2-D Barcode

To obtain a composite image, CPU 11 composites a 2-D barcode image represented by 2-D barcode data stored in RAM 14 with a sign represented by sign data defined according to the setting information stored in RAM 14 so that the barcode and the sign overlap with each other. As a result, composite image data representing a composite image is obtained. For more detailed composite process, the description will be given respectively of two different methods of a "BLANK" composite method and a "TRANSPARENT" composite method (hereinafter referred to as "BLANK" and "TRANSPARENT", respectively)

"BLANK" is a method where a portion of a 2-D barcode is cut out and deleted, and a sign is fitted into the cut-and-deleted portion. The upper limit of the area of the cut-and-deleted portion is based on an anti-stain function of the 2-D barcode used. However, even if the area of the cut-and-deleted portion is equal to or smaller than the upper limit, the cut-and-deleted portion should not include a portion designating a direction of the 2-D barcode. Where the composite method prescribed according to the setting information stored in RAM 14 is "BLANK", CPU 11 creates composite image data representing a composite image obtained by fitting the sign in the cut-and-deletable potion of the 2-D barcode.

"TRANSPARENT" is a composite method essentially comprising the following steps, 1A to 4A:

1A: to enlarge the sign to the same or a slightly smaller size of a 2-D barcode;

2A: to lay an enlarged sign on top of the 2-D barcode;

3A: to change the color of a light portion of the 2-D barcode to the color of a portion of the sign corresponding to the light portion of the 2-D barcode; and

4A: to define the image of the changed 2-D barcode as a composite image.

However, a case may occur where a reading process of a 2-D barcode may be hindered if a color of a light portion of the 2-D barcode is changed to a lower-lightness color. Automatic correction is used to prevent such a case, and when automatic correction is used, the above step 3A is changed to Step 3B as described below.

3B: when the color of a light portion of the 2-D barcode differs from the color of a portion of the sign corresponding to the light portion of the 2-D barcode, the color of the light portion of the 2-D barcode is changed to another color the lightness of which is apadjacently the same as the original color.

In this method, the sign is enlarged because the sign represented by each of sign data M1-M5 is significantly smaller than the size of the 2-D barcode. When a sign with a sufficiently large size is used, the sign does not have to be enlarged. Similarly, where the size of sign is larger than that of the 2-D barcode, the size of the sign has to be reduced.

When the setting information stored in RAM 14 defines that the composite method is "TRANSPARENT" and the automatic correction is not to be performed, CPU 11 creates composite image data representing a composite image obtained by processing the image according to the above steps 1A-4A. When the setting information stored in RAM 14 defines that the composite method is "TRANSPARENT" and the automatic correction is "YES", CPU 11 creates composite image data representing a composite image obtained by processing the image according to the above steps 1A, 2A, 3B, and 4A.

CPU 11 further adds data designating an image size to the composite image data created using the "BLANK" or "TRANSPARENT" composite method, to create print data (composite output means, output means). CPU 11 further causes display 16 to display a screen prompting the user to input an instruction for handling the created print data. Upon receiving an operation signal from operation unit 12 as a response, CPU 11 follows the instruction represented by the operation signal to either transmit the print data via USB interface 15 to printer 3 (composite output means, output means), to store the data in nonvolatile memory 13, or to abandon the data. Printer 3, when it receives the print data, prints on a printing paper, an image represented by the composite image data included in the print data with a size represented by data designating the image size included in the print data.

As will be clear from the foregoing description, the composite means comprises CPU 11, nonvolatile memory 13, and RAM 14. The composite output means comprises CPU 11, nonvolatile memory 13, RAM 14, and USB interface 15.

2-3: Printing 2 Signs at One Side of a 2-D Barcode

CPU 11 creates print data by adding two sets of sign data stored in RAM 14, data designating an image size, data designating the positional relationship on the printing paper between an image represented by 2-D barcode data and two signs, to 2-D barcode data stored in RAM 14 (multiple output means, output means). The positional relationship is defined so that each of the signs is adjacent to the 2-D barcode, with enough space being reserved around the 2-D barcode for enabling proper recognition of the barcode.

CPU 11 further causes display 16 to display a screen prompting the user to input an instruction as to the handling of the created print data. Upon receiving operation signal from operation unit 12 as a response, CPU 11 follows an instruction represented by the operation signal to transmit the print data via USB interface 15 to printer 3 (multiple output means, output means), to store the data in nonvolatile memory 13, or to abandon the data. Printer 3, when it receives the print data, prints, on the printing paper, a 2-D barcode and a sign represented respectively by 2-D barcode data and sign data included in the print data, in an image size and positional relationship represented by data designating the image size and data designating the positional relationship included in the print data.

Image output device 1 according to the present embodiment is configured as described above, but it is also possible to implement the present invention in such a way to generate, based on data designating the positional relationship, a large image containing a 2-D barcode and a sign, and use image data representing the generated large image and data designating the size of the large image, as print data.

As will be clear from the above description, the multiple output means and the output means respectively comprise CPU 11, nonvolatile memory 13, RAM 14, and USB interface 15. When it is modified such that image output device 1 is connected to printer 3, not with USB cable 2 but via a network, the multiple output means or the output means comprises a network interface such as a LAN card or a wireless communication unit instead of USB interface 15.

Figure 11:
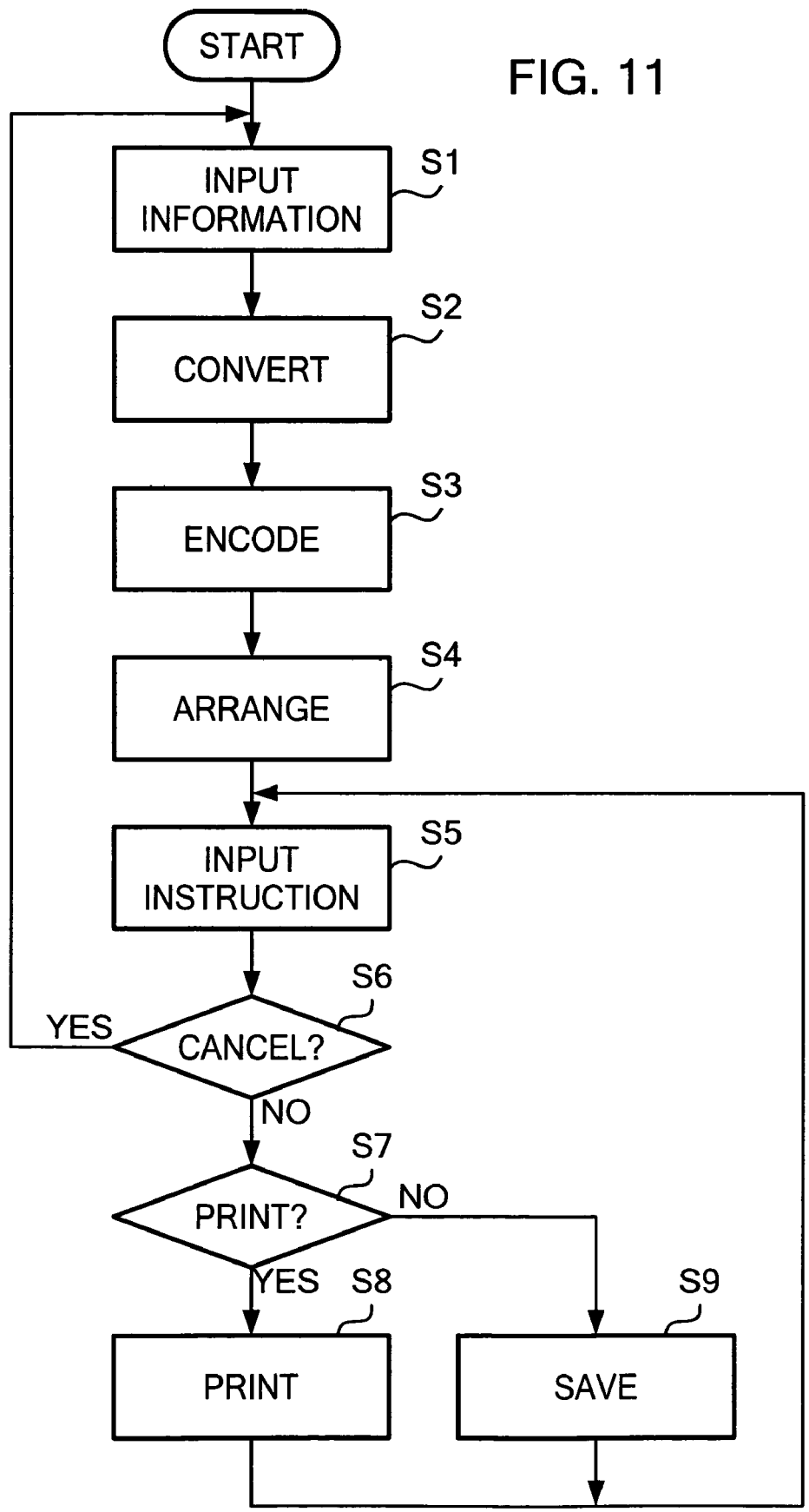
FIG. 11 is a flowchart showing an example flow of an operation performed by image output device 1.

Description will now be given of the operation of the image output device 1 with the above configuration, mainly referring to FIG. 11.

EXAMPLE 1

Detailed description will be given of the operation of image output device 1 in the information distribution system, an overview of which has been described at the beginning of the present embodiment.

CPU 11, based on operation signal received from operation unit 12, causes display 16 to display a screen shown in FIG. 9. The user, while viewing the screen, operates operation unit 12 to input content information (the title of a bookmark and its URL) and setting information (the size of a barcode). CPU 11 stores the input content information and setting information in RAM 14, and shows on the screen the details of the content information and setting information stored in RAM 14. Indicator IG3 on the screen is updated every time content information or setting information is changed.

CPU 11, based on operation signal received from operation unit 12, causes display 16 to display a screen shown in FIG. 10. The user, while viewing the screen, operates operation unit 12 to input setting information. In this example, Format A is used as the format for content information; specifically, a sign(s) is used; the sign data M1 for Format A is used for the first sign; the second sign is not used; the arrangement pattern is set as "SIDE"; and the pitch is set as "0.35".

The user then uses operation unit 12 to display the screen shown in FIG. 9. When the user performs an operation of pressing a "GENERATE" button B1 in the screen, CPU 11 terminates the above information input process (Step S1), converts content information in RAM 14 to a character string of a format prescribed in the setting information stored in RAM 14 (i.e., Format A) (Step S2), encodes the converted character string to generate a 2-D barcode, and stores, in RAM 14, 2-D barcode data that is image data representing the 2-D barcode (Step S3).

CPU 11 then creates print data by determining an image size based on the pitch and the barcode size prescribed in the setting information stored in RAM 14 and by adding sign data prescribed in the setting information stored in RAM 14, data designating the image size, and a positional relationship on the printed paper between an image represented by the 2-D barcode data and a sign represented by the sign data, to the 2-D barcode data stored in RAM 14 (Step S4).

Subsequently, CPU 11 causes display 16 to display a screen shown in FIG. 12 and waits for the user's instruction (Step S5). In this example, the user performs an operation of pressing a "PRINT" button B3 by using operation unit 12. CPU 11, when it receives operation signal corresponding to the user's operation, transmits the generated print data via USB interface 15 to printer 3 (Step S6: NO, S7: YES, S8).

Printer 3 receives the print data and prints on the printing paper a 2-D barcode for Format A and the sign for Format A. As a result, the 2-D barcode and the sign shown on the paper 4A in FIG. 1 are printed such that their size corresponds to the prescribed pitch and barcode size, and such that the sign is adjacent to the 2-D barcode with enough space being reserved around the 2-D barcode to enable clear recognition of the barcode.

Figure 12:
FIG. 12 is a diagram showing an example of a display screen of image output device 1.

CPU 11, after transmitting the print data via USB interface 15 to printer 3, again causes display 16 to the screen shown in FIG. 12 and waits for the user's instruction (Step S5). In this example, the user then uses operation unit 12 to perform an operation of pressing a "CANCEL" button B2 on the screen. Upon receiving an operation signal corresponding to the operation, CPU 11 again causes display 16 to display the screen shown in FIG. 9 (Step S6: YES, Step S1). At this time, the 2-D barcode data stored in RAM 14 is abandoned.

Subsequently, CPU 11, based on operation signal received from operation unit 12, causes display 16 to display the screen shown in FIG. 10. The user, viewing the screen, operates operation unit 12, updates the setting information. In this example, the format used for the content information is changed to Format B; a sign(s) is used; and the sign data M2 for Format B is used for the first sign.

When the user uses operation unit 12 to display the screen shown in FIG. 9, and performs an operation of pressing a "GENERATE" button B1 on the screen, CPU 11 terminates the above information input process (Step S1), and performs the same process as described above (Steps S2-S5, S6: N0, S7: YES, S8). Thus, the paper 4B with printout of a 2-D barcode for Format B and the sign for Format B is obtained.

EXAMPLE 2

Next, description will be given of an example of an operation where the composite image of a 2-D barcode and a sign is created using the "BLANK" method.

In this example, the details of the setting information stored in RAM 14 at the time when the information input process of Step S1 is completed are: Format A is used for the content information; a sign(s) is used; the sign data M1 for Format A is used as the first sign; the second sign is not used; the arrangement pattern is set as "COMPOSITE"; the composite method is set as "BLANK"; and the pitch is set as "0.35".

Figure 13:
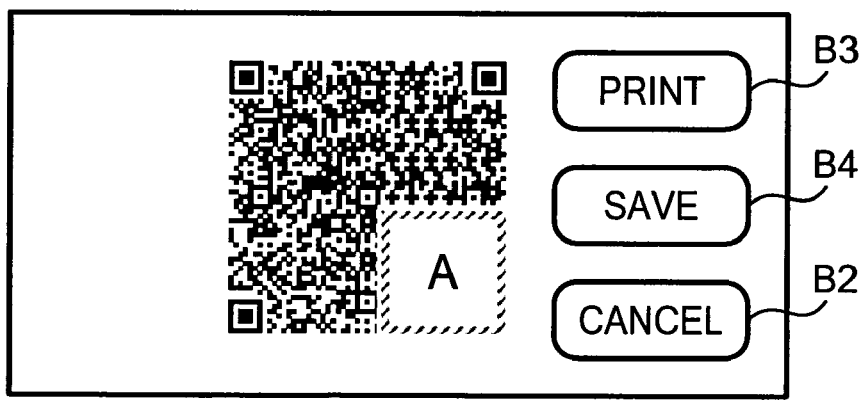
FIG. 13 is a diagram showing an example of a display screen of image output device 1.

CPU 11 generates a 2-D barcode based on the stored setting information and the input content information, and stores in RAM 14 2-D barcode data representing the 2-D barcode (Step S2, S3). CPU 11 determines an image size based on the pitch and the barcode size prescribed in the setting information stored in RAM 14. CPU 11 generates composite image data representing a composite image obtained by filling the sign represented by the sign data M1 for Format A in a cut-and-deletable portion of the 2-D barcode represented by the 2-D barcode data. CPU 11 then adds, to the generated composite image data, data designating the determined image size to create print data (Step S4). Subsequently, CPU 11 causes display 16 to display a screen in FIG. 13. Further operation is the same as that described in Example 1.

EXAMPLE 3

Next, description will be given of another example of an operation of creating a composite image of a 2-D barcode and a sign by using the "TRANSPARENT" composite method without automatic correction.

In this example, the setting information stored in RAM 14 at the time when the information input process of Step S1 is completed comprise: Format A is used for the content information; a sign(s) is used; the sign data M1 for Format A is used as the first sign; the second sign is not used; the arrangement pattern is set as "COMPOSITE"; the composite method is set as "TRANSPARENT"; the automatic correction is not used; and the pitch is set as "0.35".

Figure 14:
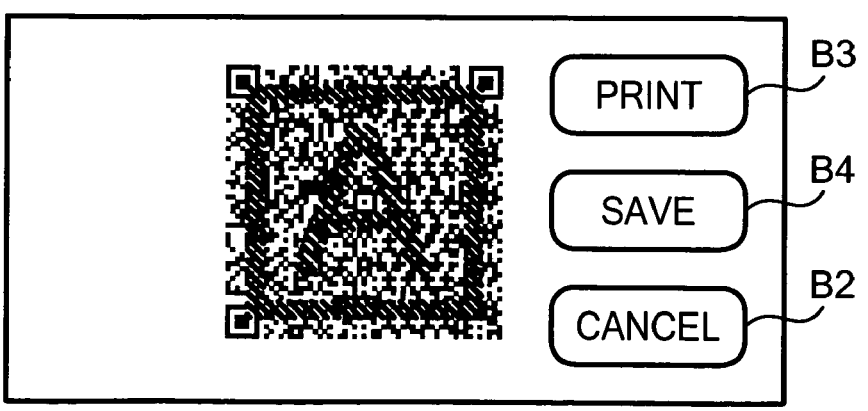
FIG. 14 is a diagram showing an example of a display screen of image output device 1.

CPU 11 generates a 2-D barcode based on the setting information and the input content information, and stores in RAM 14 the 2-D barcode data representing the 2-D barcode (Step S2, S3). CPU 11 then determines an image size based on the pitch and the barcode size prescribed in the setting information stored in RAM 14. CPU 11 also creates composite image data by performing an image operation. Specifically, CPU 11 enlarges the size of a sign represented by the sign data M1 for Format A to the same or a slightly smaller size as the 2-D barcode represented by the 2-D barcode data stored in RAM 14. CPU 11 then superimposes the enlarged sign on the 2-D barcode, and changes the color of a light portion of the 2-D barcode to the color of the sign corresponding to the light portion of the barcode. As a result of the above image operation, the composite image data representing the changed 2-D barcode is created. Subsequently, CPU 11 adds, to the created composite image data, data designating the determined image size to generate print data (Step S4). CPU 11 then causes display 16 to display a screen shown in FIG. 14. The subsequent operation is the same as Example 1.

EXAMPLE 4

Next, description will be given of another example of an operation of creating a composite image of a 2-D barcode and a sign using a "TRANSPARENT" composite method with the automatic correction.

Figure 15:
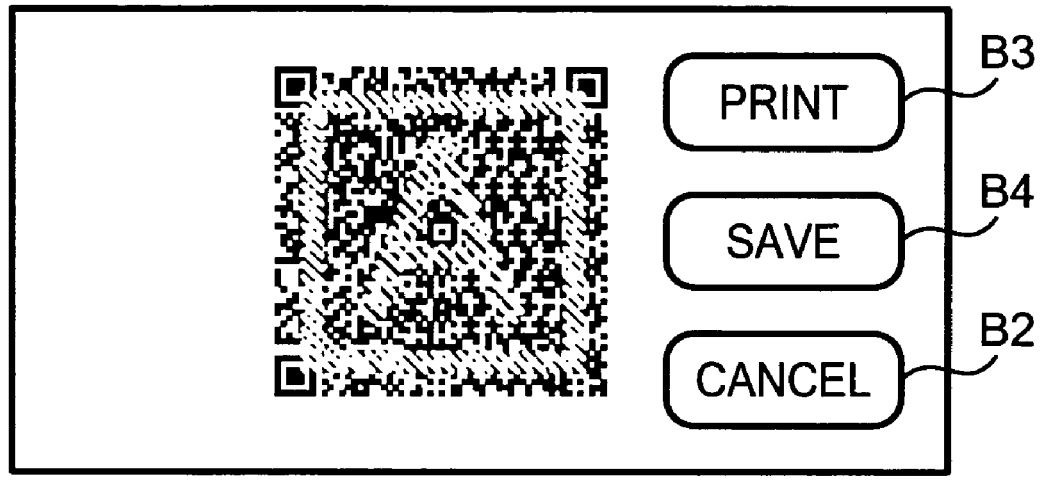
FIG. 15 is a diagram showing an example of a display screen of image output device 1.

In this example, the details of the setting information stored in RAM 14 at the time when the information input process of Step S1 is completed are the same as those in Example 3 except that the automatic correction is used. Thus, in Example 4, only the composite process of the image is different from that of Example 3. In the composite process in Example 4, CPU 11 performs an image operation of changing the color of a part of a light portion of the 2-D barcode to another color whose lightness is about the same as the color of the light portion, where the color of the part of the light portion is different from the corresponding part of the enlarged sign. As a result, composite image data representing the changed 2-D barcode is created, and a screen shown in FIG. 15 is displayed on display 16. The subsequent operation is the same as that of Example 1.

EXAMPLE 5

Next, description will be given of an example of an operation of printing 2 signs to one side of a 2-D barcode.

CPU 11, based on an operation signal received from operation unit 12, causes the screen shown in FIG. 7 to be displayed on display 16. The user, while viewing the screen, operates operation unit 12 to input content information (a name, a telephone number, an electronic mail address, and memos) and setting information (the size of a barcode). In this example, the name and memos are input in Japanese in two-byte code.

CPU 11, according to operation signal from operation unit 12, causes a screen shown in FIG. 10 to be displayed on display 16. The user, while viewing the screen, operates operation unit 12 to input setting information. In this example, the format of content information is set as Format A; a sign(s) is used; sign data M1 for Format A is used for the first sign; the Japanese sign data M3 is used for the second sign; the arrangement pattern is set as "SIDE"; and the pitch is set as "0.25".

Figure 16:
FIG. 16 is a diagram showing an example of a display screen of image output device 1.

When the process of inputting the setting information listed above in Step S1 is completed, the same process as described in Example 1 is performed until the routine proceeds to the arrangement process in Step S4. In the arrangement process, CPU 11 determines an image size based on the pitch (0.25) and the barcode size defined in the setting information stored in RAM 14. CPU 11 then creates print data by adding to the 2-D barcode data stored in RAM 14, two sets of sign data M1 and M3 stored in RAM 14, data designating the image size, and the positional relationship on the printed paper between an image represented by the 2-D barcode data, and two signs represented by the sign data M1 and M3. Subsequently, CPU 11 causes display 16 to display a screen in FIG. 16 and waits for the user's instruction (Step S5). The subsequent steps performed are the same as those of Example 1, and a printing paper is ejected from printer 3, on which a sign indicating Format A and a sign indicating Japanese is printed to one side of the 2-D barcode.

Further in this example, the user, while viewing the screen shown in FIG. 10, changes the format for the first sign to the sign data M2 for Format B and inputs an instruction for creating and printing a 2-D barcode. As a result, a printing paper is ejected from printer 3, on which a sign indicating Format B and a sign indicating Japanese is printed to one side of the 2-D barcode.

Still further in this example, the user, while viewing the screen shown in FIG. 7, substitutes a part of the content information (the name and memo) written in Japanese with those written in English in one byte code. The user also views the screen shown in FIG. 10 to change the second sign to the English sign data M4, and enters an instruction for creation and printout of the 2-D barcode. As a result, printer 3 ejects a printing paper on which a sign indicating Format B and a sign indicating English are printed to one side of the 2-D barcode.

The user further views the screen shown in FIG. 10 and changes the first sign to the sign data M1 for Format A, and instructs creation and printing of the 2-D barcode. As a result, a printing paper is ejected from printer 3, on which a sign indicating Format A and a sign indicating English are printed to one side of the 2-D barcode.

Figure 17:
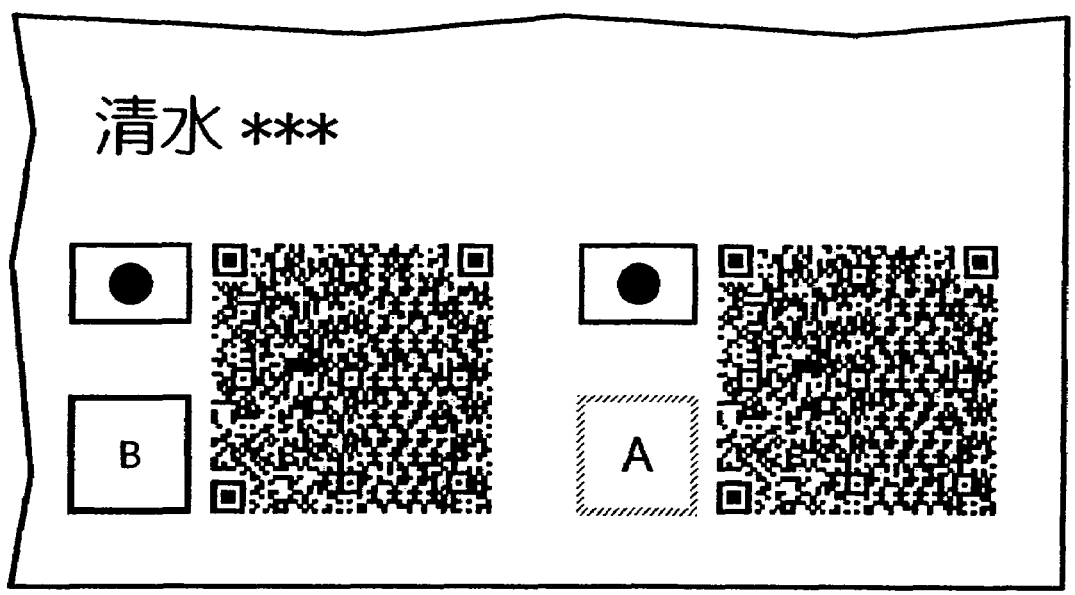
FIG. 17 is an example diagram showing a printout on one side of a business card created using print data output by image output device 1.
Figure 18:
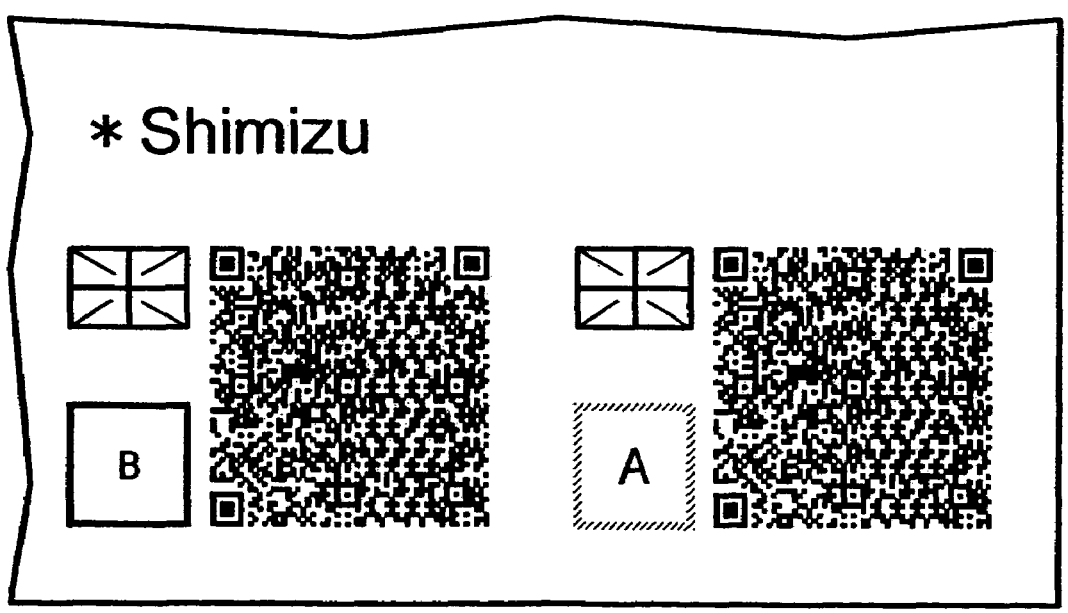
FIG. 18 is an example diagram showing a printout on the other side of a business card created using print data output by image output device 1.

Thus printed images are printed, for example, on a business card, a side of which is written in Japanese as shown in FIG. 17 and another side is written in English as shown in FIG. 18. When the user of a mobile station 6A receives such a business card, the user, when he/she wishes to have data in Japanese, causes his/her mobile station 6A to read a 2-D barcode that is printed to the one side of a sign indicating Japanese. When he/she wishes to have data in English, he/she causes his/her mobile station 6A to read a 2-D barcode that is printed to the other side of a sign indicating English.

EXAMPLE 6

Next, description will be given of an example of an operation of using the original sign data M5.

This example operation is suited for a case of distributing a paper with a print of a 2-D barcode having content information required in providing a service intended for use by a particular person.

CPU 11, based on operation signal received from operation unit 12, causes display 16 to display the screen shown in FIG. 8. A service provider, while viewing the screen, operates operation unit 12 to input content information (a destination electronic mail address, and the title and text of an electronic mail) and setting information (a barcode size).

CPU 11, according to operation signal received from operation unit 12, causes display 16 to display the screen shown in FIG. 10. The service provider, while viewing the screen, operates operation unit 12 to input setting information. In this example, the format for the content information is set as Format A; a sign(s) is used; the original sign data M5 is used for the first sign; the second sign is set as "NONE"; the arrangement pattern is set as "SIDE"; and the pitch is set as "0.35". To select the original sign data M5, the service provider has to check "ORIGINAL" on the screen, and then input information for specifying a file containing original sign data M5 (e.g. a path name).

Figure 19:
FIG. 19 is an example diagram showing image printed out using print data output from image output device 1.

When the input process of the above information in Step S1 is completed, the operation that is the same as Example 1 is performed. As a result, a printing paper is ejected from printer 3, on which a sign represented by original sign data M5 positioned to one side of the 2-D barcode (refer to FIG. 19) is printed. The sign is, for example, a photograph of the service provider's face.

Figure 20:
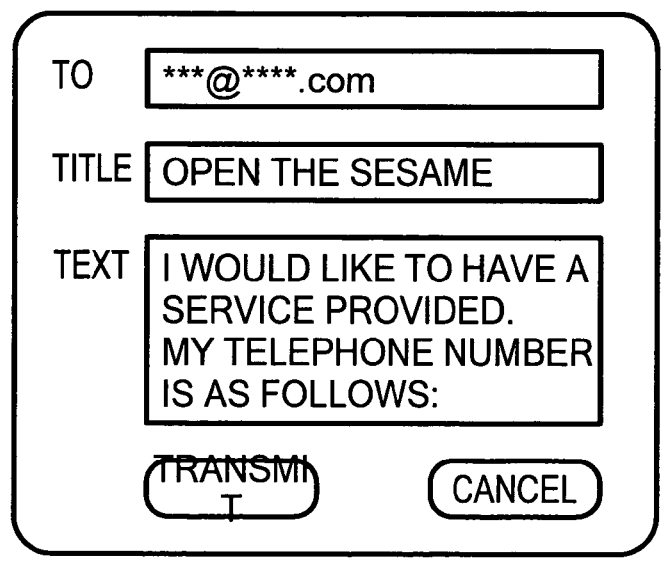
FIG. 20 is an example screen displayed by a mobile station 6A when information is distributed using image output device 1.

In the case of receiving a paper only with a 2-D barcode printed, it is not always possible to remember who has provided the paper after a certain period, for example, when several weeks have passed. In such a case, a user of mobile station 6A, a receiver of the paper, uses his/her mobile station 6A to have the mobile station 6A to read the 2-D barcode and decode content information as a first step. Where a new-mail-write function is started after the first step, the user is unsure as to whether to transmit an electronic mail created by the function because he/she is afraid that his/her own electronic mail address is likely to be informed to an unidentified correspondent. The user becomes even more cautious especially when the electronic mail prompts the user to transmit personal information in such a case as shown in FIG. 20.

On the other hand, in Example 6 according to the present invention, the receiver of the paper is able to recall who has provided the paper because the 2-D barcode printed out in the example is attached with a photograph of the provider's face. Therefore, there is less possibility of a case where the user ends up not using decoded information read out from the 2-D barcode. In this example, the user enters his/her telephone number in the text portion of the electronic mail shown in FIG. 20 and transmits the completed mail. The service provider who has received the mail is able to identify that a sender of the mail is a qualified person on the basis of a keyword shown in a title portion and to confirm the identity of the sender on the basis of the telephone number in the text portion. Thus, provision of the service is started.

EXAMPLE 7

In Example 1, when the user operates operation unit 12 to perform an operation of pressing a "SAVE" button B4 in the screen shown in FIG. 12, CPU 11 stores the print data in nonvolatile memory 13. The print data stored in nonvolatile memory 13 may be used in various ways such that the data can be printed out using another computer after writing the data into a FD (flexible disk) using an external FD drive that can be connected to USB interface 15. It is also possible to use a mailer provided with an operating system of image output device 1 to send the data to another computer.

Modification to the First Embodiment

In the foregoing, the first embodiment of the present invention has been described. The embodiment can be implemented even when modified as follows.

Figure 21:
FIG. 21 is an example diagram showing image printed out using print data output from image output device 1.

In Example 5 of the above embodiment, the 2-D barcode shown in FIG. 17 or FIG. 18 cannot be read correctly when, for example, mobile station 6B is compatible only with the pitch 0.25. In such a case, the user of mobile station 6B is mistaken that a failure has occurred and repeats the reading operation of the barcode. To avoid such redundancy, image output device 1 may be modified so that a sign designating a pitch as shown in FIG. 21 may be selected.

In another modification, image output device 1 may be modified to select more than three signs instead of selecting the maximum of two signs as in the above embodiment.

Image output device 1 may also be modified so that various images may be selected such as an image indicating a telephone, and an image indicating an electronic mail.

There may be also a case where the barcode cannot be read correctly due to compatibility problems because a version of the format used in the barcode is different from one used in mobile station 6. For this reason, image output device 1 may be modified so that an image designating a version of the format can be selected.

While in the above embodiment, only one type of encoding method is provided, the user of image output device 1 may also select one of a plurality of types of encoding methods. In this case, image output device 1 may be modified so that an image designating a type of a 2-D barcode used can be selected since some types of 2-D barcodes resemble one another.

Further, in the above embodiment, an example is shown where a sign indicating Japanese is used when content information contains Japanese text. However, such a sign may be used even when Japanese text is not contained in content information itself. For example, the sign may be used in such a case where the content that can be accessed using content information is written in Japanese or where the provider of information is a Japanese person.

Also, image output device 1 may be modified so that, when two-byte code is input as content information where a sign indicating English is selected, the user is notified of the event.

In the above-described embodiment, when the transparent composite method with automatic correction is selected, a monochrome sign is created. Image output device 1 may be modified so as to use a color of the sign if the color has about the same lightness as a light portion of a 2-D barcode.

While, in the above embodiment, a notebook computer is used as image output device 1, it is also possible to add functions of image output device 1 to any type of a computer. Also, when the present invention is applied in such a way as described in Example 7, a mobile communication terminal such as a portable phone may be equipped with a function of image output device 1 as in the second embodiment below.

Second Embodiment

Figure 22:
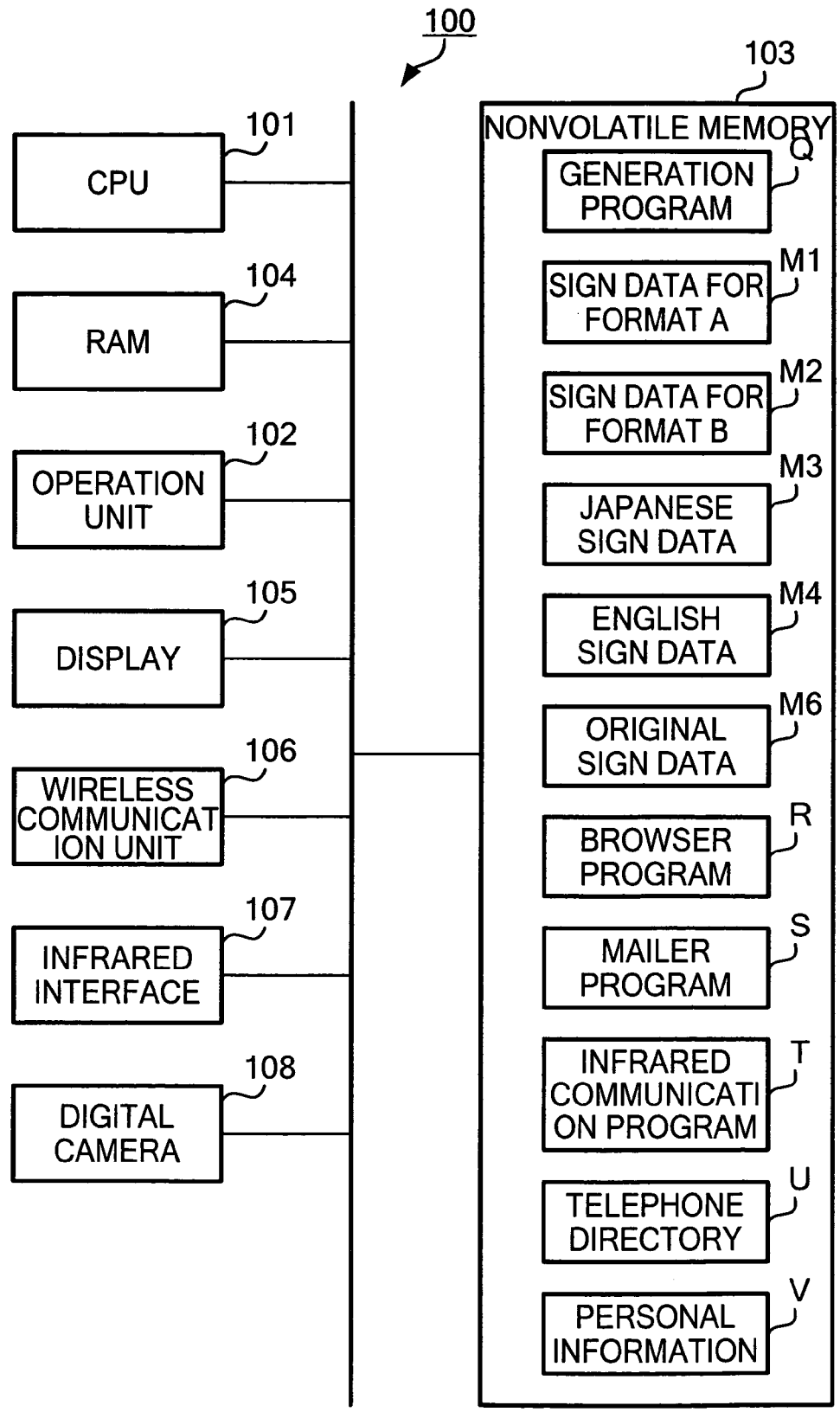
FIG. 22 is a block diagram showing a configuration of a mobile communication terminal 100 according to a second embodiment of the present invention.

FIG. 22 is a block diagram showing a configuration of a mobile communication terminal 100 according to a second embodiment of the present invention. As is clear from the diagram, mobile communication terminal 100 is a computer capable of executing a program. Also, mobile communication terminal 100 is provided with all the functions which mobile station 6A shown in FIG. 1 is provided with.

A CPU 101 of mobile communication terminal 100 receives operation signal from an operation unit 102 having operators and executes a command represented by the operation signal. For example, CPU 101, when the command tells to execute a program stored in a nonvolatile memory 103, uses a RAM 104 as a work area to read the program from nonvolatile memory 103 for the execution of the program.

Also, CPU 101, according to a command from a running program, reads and/or writes data from/to nonvolatile memory 103 and RAM 104, supplies image data to display 105, performs radio communication performed by means of a wireless communication unit 106 via mobile packet communication network 7 (refer to FIG. 24), performs infrared communication by means of an infrared interface 107, and controls a digital camera 108.

Nonvolatile memory 103 stores a browsing program R. CPU 101, based on operation signal from operation unit 102, uses the browsing program R to download a generation program Q and sign data M1-M4 from a distribution server 200 connected to the Internet 8, for storage of the downloaded program and data in nonvolatile memory 103. Nonvolatile memory 103 stores a mail program S for writing, transmitting or receiving electronic mail. CPU 101, based on operation signal from operation unit 102, uses the mail program S to write, transmit, or receive electronic mail with attachment of non-text data.

In addition, nonvolatile memory 103 stores an infrared communication program T for performing infrared communication with another device by means of infrared interface 107, a telephone directory U for recording the name of a correspondent, a telephone number, an electronic mail address, and memos (any information). Nonvolatile memory 103 also stores personal information V such as a telephone number of its own mobile communication terminal 100 and original sign data M6 that serves the same purpose as the original sign data M5 in FIG. 6. Here, it is possible to use image data representing a photo image shot using digital camera 108 as the original sign data M6.

Figure 23:
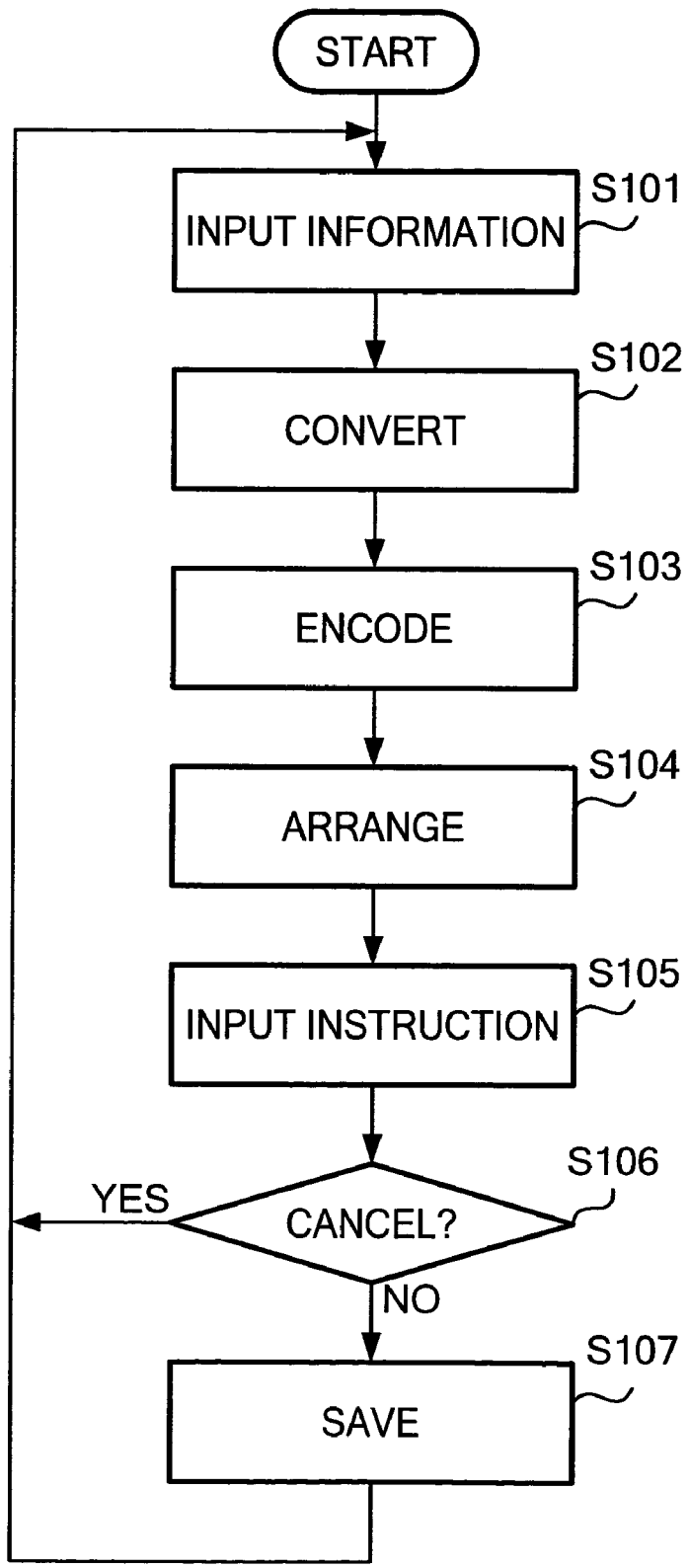
FIG. 23 is a flowchart showing a flow of processes performed by mobile communication terminal 100.

FIG. 23 shows a flow of processes performed by mobile communication terminal 100 when the above generation program Q is being executed by CPU 101. Steps S102-S104 and S106 in the figure correspond to Steps S2-S4 and S6 in FIG. 11, respectively. Step S107 differs from Step S9 in that data for output is stored in nonvolatile memory 103 instead of nonvolatile memory 103. Step S101 is different from Step S1, as is detailed in the following.

The generation program Q provides a user interface tailored to specific requirements of mobile communication terminal 100. The generation program Q is designed in such a way because the display area of display 105 is smaller than that of display 16; and operation unit 102 provides a considerable degree of limited operability compared to operation unit 12.

When the operation signal received from operation unit 102 is a user instruction to copy and use a part of or all of information in the telephone directory U or the personal information V, CPU 101 automatically inputs the designated information stored in nonvolatile memory 103 for use as content information. The generation program Q is thus designed to take advantage of a characteristic of the portable phone that personal information is stored. Also, since the portable phone has limited operability for inputting information, the program Q is designed so that input of content information is made easy for a portable phone.

The generation program Q provides a user interface for enabling the user to specify a pictographic character such as a heart mark. Pictographic characters are often used in user-to-user communication using portable phones, and therefore a general mobile communication terminal stores character data representing many types of pictographic characters. The program Q is designed to take advantage of such an existing resource. Also, a reduction in transmitted data amount is envisioned by use of character data.

Step S105 differs in that a user interface tailored especially to mobile communication terminal 100 is used. Also, in Step S105, there is provided no user interface for prompting the user to input an instruction for printout ("PRINT" button B3 in the first embodiment) because in the flow of operation for the present embodiment, there are no steps corresponding to Steps S7 and S8 of the first embodiment. These steps are omitted since the generation program Q is designed not to perform the output of the generated data for the reason described below.

There are three modes of outputting data for output from mobile communication terminal 100: displaying the data on display 105; transmitting the data as an attachment to an electronic mail; and transmitting the data by means of infrared communication. A program other than the generation program Q is used for the output process in each of these modes. Therefore, if data for output is once stored in nonvolatile memory 103, any of the output modes can be performed by using a well-known program suited for each of the modes. It should suffice as long as the generation program Q generates data for output (generation process, designated generation process, multiple generation process, and composite generation process) and stores the data in nonvolatile memory 103. Thus, in the present embodiment, generation means, designated generation means, multiple generation means, and composite generation means implemented when CPU 101 executes the generation program Q respectively consists only of CPU 101, nonvolatile memory 103, and RAM 104.

Figure 24:
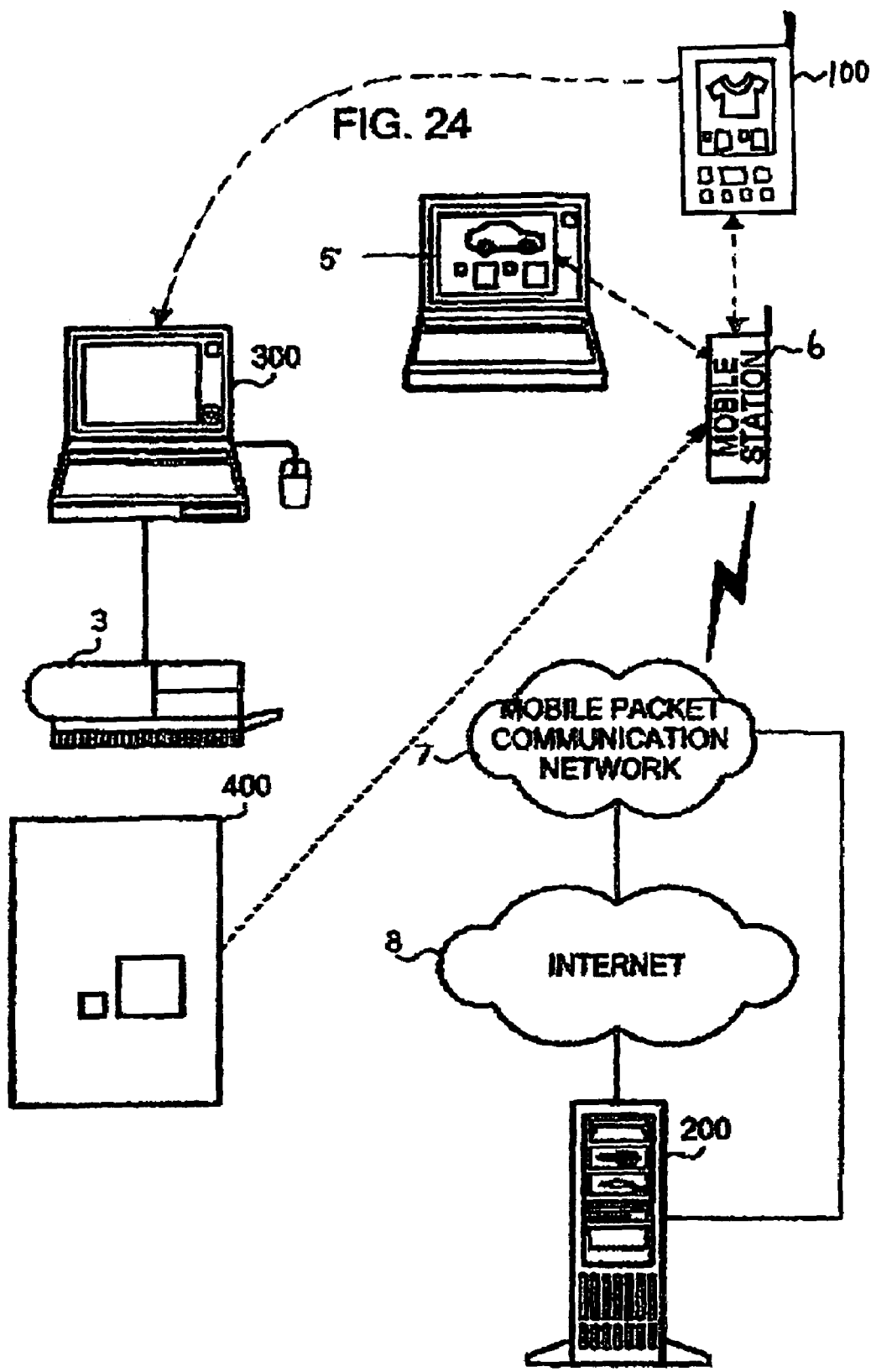
FIG. 24 is a diagram used for describing how information is distributed using mobile communication terminal 100.

As shown in FIG. 24, a computer 300 has an infrared communication function and is capable of receiving via infrared communication data transmitted from a mobile communication terminal 100. In this example, the flow of the operation shown in FIG. 23 is performed by mobile communication terminal 100; that is, data for output including 2-D barcode data for Format A and sign data M1 for Format A are generated and then stored in nonvolatile memory 103.

When the user operates operation unit 102 of mobile communication terminal 100 to instruct transmission of the data for output, CPU 101 uses an infrared communication program T to transmit, to computer 300, the data for output stored in nonvolatile memory 103 via infrared interface 107. Computer 300 receives the data for output and, based on the user's instruction, transmits the data to a printer 3. Printer 3, when it receives the data for output, performs a printing operation based on the data for output. As a result, a printing paper 400 is ejected from printer 3, on which a 2-D barcode and a sign for Format A are printed. In the printing paper 400, the sign is positioned adjacent to the 2-D barcode with enough space being reserved around the 2-D barcode for enabling the clear recognition of the barcode. Thus, mobile station 6 is enabled to read the 2-D barcode correctly from printing paper 400.

Figure 25:
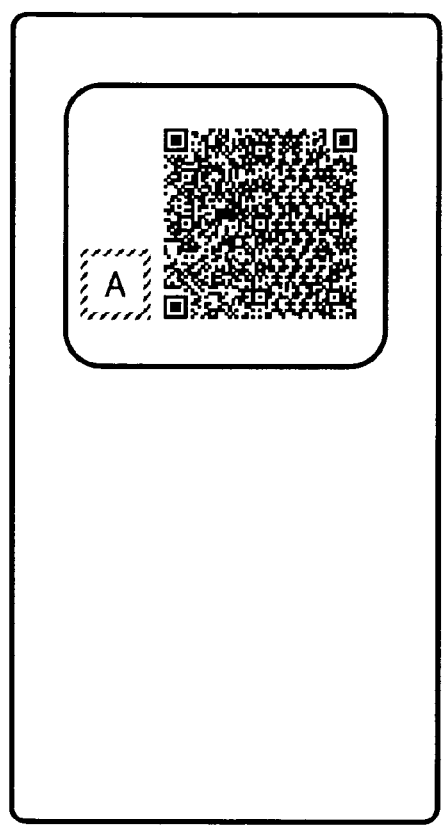
FIG. 25 is a diagram showing how a barcode is displayed by mobile station 6.

When the user operates operation unit 102 of mobile communication terminal 100, whereby the display of the data for output is instructed, CPU 101 uses a display program (not shown) stored in nonvolatile memory 103 to cause display 110 to display an image represented by the data for output stored in nonvolatile memory 103. As a result, as shown in FIG. 25, a 2-D barcode and a sign for Format A are displayed on display 105. In the display screen, the sign is positioned adjacent to the 2-D barcode with enough space being reserved around the 2-D barcode for enabling the clear recognition of the barcode. Thus, a user holds his/her mobile station 6 over mobile communication terminal 100, whereby mobile station 6 is enabled to correctly read the 2-D barcode.

The user first operates operation unit 102 of mobile communication terminal 100, thereby instructing the transmission of the data for output as an attachment to electronic mail for mobile station 6. CPU 01 then uses a mailer program S to transmit, via wireless communication unit 106, electronic mail for mobile station 6 by attaching to the mail the data for output stored in nonvolatile memory 103. The electronic mail is directed to mobile station 6 via mobile packet communication network 7 and received by mobile station 6. From then on, when a user of mobile station 6 performs an operation to mobile station 6, thereby instructing the display of the data for output attached to the electronic mail, a 2-D barcode and a sign for Format A are displayed on the display of mobile station 6 as shown in FIG. 25. In the display screen, the sign is positioned adjacent to the 2-D barcode with enough space being reserved around the 2-D barcode for enabling the clear recognition of the barcode. Thus, the user of mobile station 6 is able to have another device correctly read the displayed 2-D barcode.

Modifications to the Second Embodiment

In the foregoing, the second embodiment of the present invention has been described. The present invention can also be implemented by modifying the embodiment as in the following.

In the above embodiment, the output process of outputting the data for output is performed by an existing program such as the mailer program S or the infrared communication program T, but the generation program Q may be redesigned to perform the output process.

Also, while in the above embodiment the data for output is stored in nonvolatile memory 103, the embodiment may be modified such that data necessary for generating data for output is stored in nonvolatile memory 103, and data for output is generated, at the time of output, using the data stored in nonvolatile memory 103.

Infrared communication is taken as an example of close range communication, but another method of communication may be used. Also, a medium used for outputting data for output is not limited to a display device or a communication medium. For example, data for output may be stored in a memory card removable from mobile communication terminal 100, so that the memory card is removed from mobile communication terminal 100 and carried.

In the above second embodiment, distribution server 200 connected to the Internet 8 transmits a generation program Q to mobile communication terminal 100. However, it is also possible to have a gateway server connecting mobile packet communication network 7 and the Internet 8, or a server connected only to mobile packet communication network 7 to transmit the generation program Q to mobile communication terminal 100.

Also, a computer connecting mobile packet communication network 7 and the Internet 8 (e.g. a gateway server) or a computer connected only to mobile packet communication network 7 may be caused to execute a server-type modified program obtained by modifying the generation program Q so that the data for output is generated by such a server based on a request from a mobile communication terminal and returned to the terminal. The modifications made to the generation program Q are general modifications made when a stand-alone type program is modified to a client/server type program. In this case, a mobile communication terminal must execute a client type program corresponding to the modified program. However, it is also possible to design the modified program so that a browsing program provided with an existing mobile communication terminal can perform the process performed by the corresponding client type program; in this way, an existing mobile communication terminal may be used without making any modifications.

Third Embodiment

In another embodiment of the present invention a barcode is associated with a display generated by the method as described herein with respect to the first embodiment. However, as used herein, the term "display" can mean either a documentary display, such as, for example, a poster, or an electronic display, such as a computer screen, a television screen, or the like. In addition, the term "electronic display" is to be construed herein to include a display projected onto a surface. The configuration of the system according to the present embodiment is similar to that shown in FIG. 1, however, the content of the barcode is different from that of the barcode described in the first embodiment. In this embodiment, the mobile station 6, such as, but not limited to a cellular phone, a personal data assistant (PDA), a pocket personal computer, or the like is employed.

In the third embodiment, the advertiser is, for example, an automobile company with worldwide distribution. The automobile company owns a web server device 9, and provides various information, including product advertisements, on their automobile products in a web page. Specifically, the automobile company has established a web page capable of being displayed in more than one language, such as English, Japanese, and Spanish, for use in advertising and providing information on their automobile products. A user of the mobile station 6 is a potential customer of the automobile company, and may be conversant in Japanese, English, or Spanish.

Figure 26:
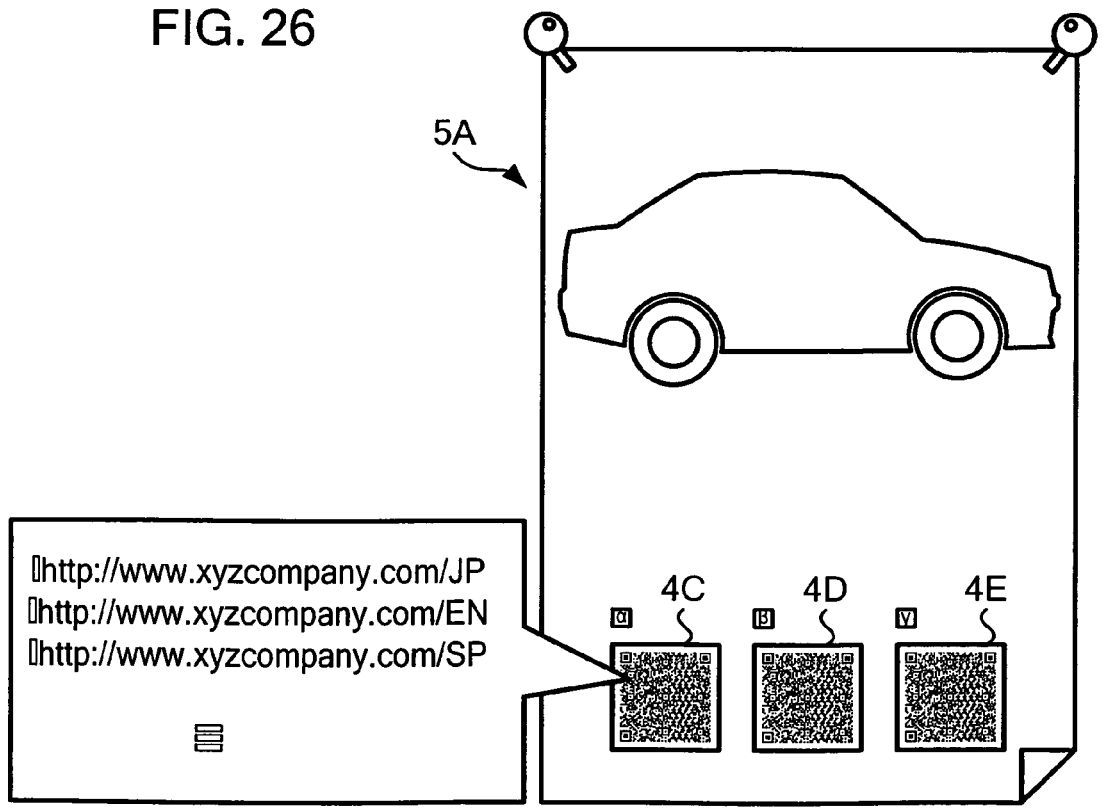
FIG. 26 is a schematic diagram of a poster 5A according to a third embodiment of the present invention.

As shown in FIG. 26, three barcodes 4C, 4D, and 4E are printed at the bottom of poster 5A. There are added signs or indicators "α", "β", "γ" to the upper side of barcodes 4C, 4D, or 4E, respectively, each sign designating an encoding method so that a user is able to recognize which encoding method is used. These signs can, for example, correspond to different encoding methods used for a barcode depending, for example, on a vendor of a mobile station. In addition, the indicators can also designate a particular language, sex, or age group. Encoded in each of the three barcodes is URL information. These three URLs are web page addresses created by the automobile company in the Japanese, English, and Spanish languages, respectively, where detailed information regarding advertised content (e.g. news on a new automobile soon for sale) on poster 5A can be referred to.

Encoded in the barcodes according to the present invention is script data described in compact HTML or a like language. Any data configuration may be used for the script data, but the script should be able to be interpreted and executed by a barcode processing program stored in the mobile station 6. Specifically, instruction codes including instructions for reading or writing various data as well as a plurality of URLs are contained in the script data. When the script is interpreted and executed in the mobile station 6, one or a plurality of URLs is extracted after a predetermined conditional determination process is performed according to a trigger embedded in the script data or stored in the mobile station 6.

Figure 28:
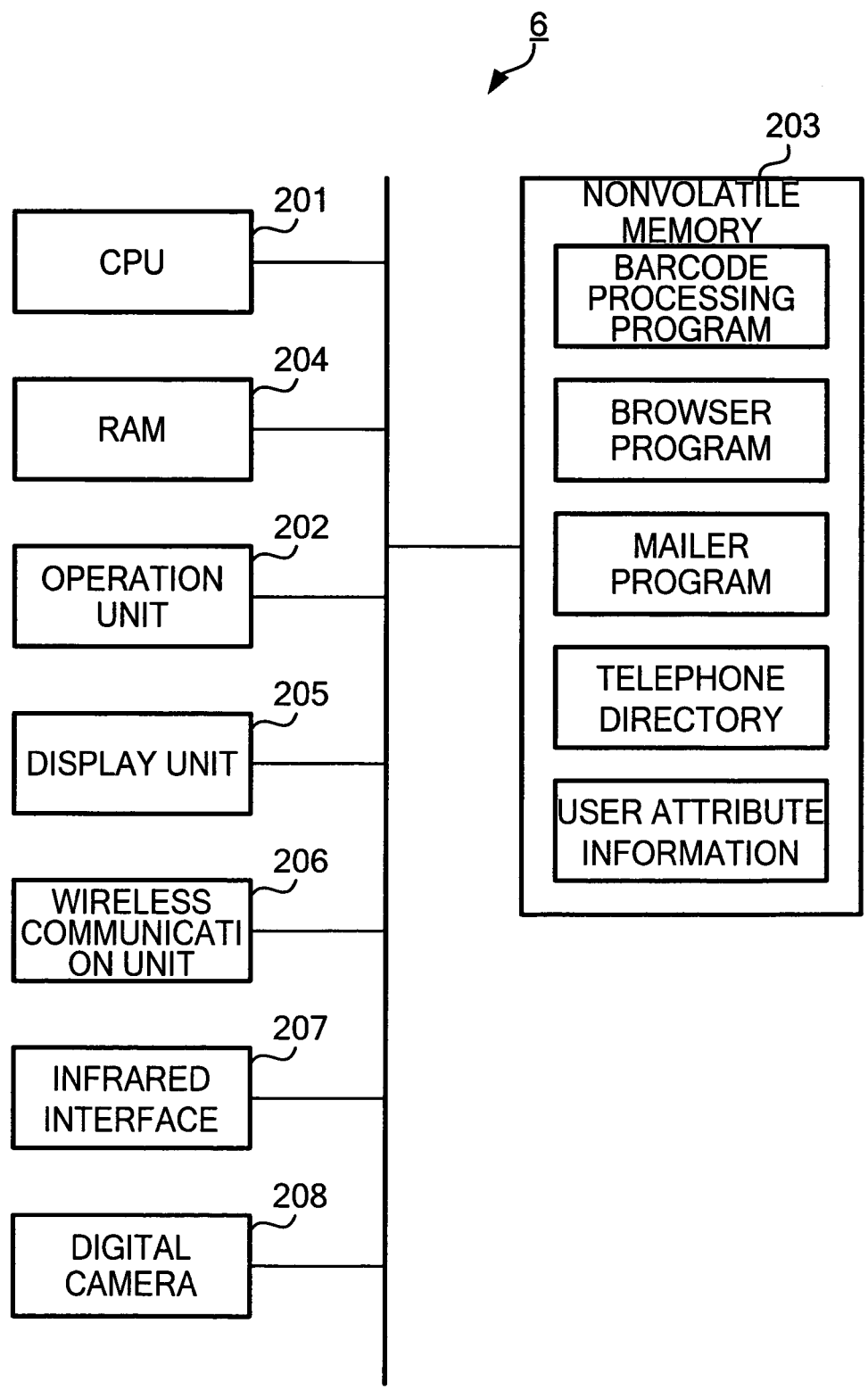
FIG. 28 is a block diagram showing a configuration of a mobile station 6.

As shown in FIG. 28, user attribute information is stored in nonvolatile memory 203. The user attribute information can be, for example, nationality, preferred language, age, sex, a type of a credit card to be used for on-line shopping, and other information unique to a user of the mobile station 6. The user attribute information can be input by the user. The barcode processing program allows for the above barcode, decoding data to be read. This data is interpreted when the decoded information is script data.

EXAMPLE 1

Figure 27:
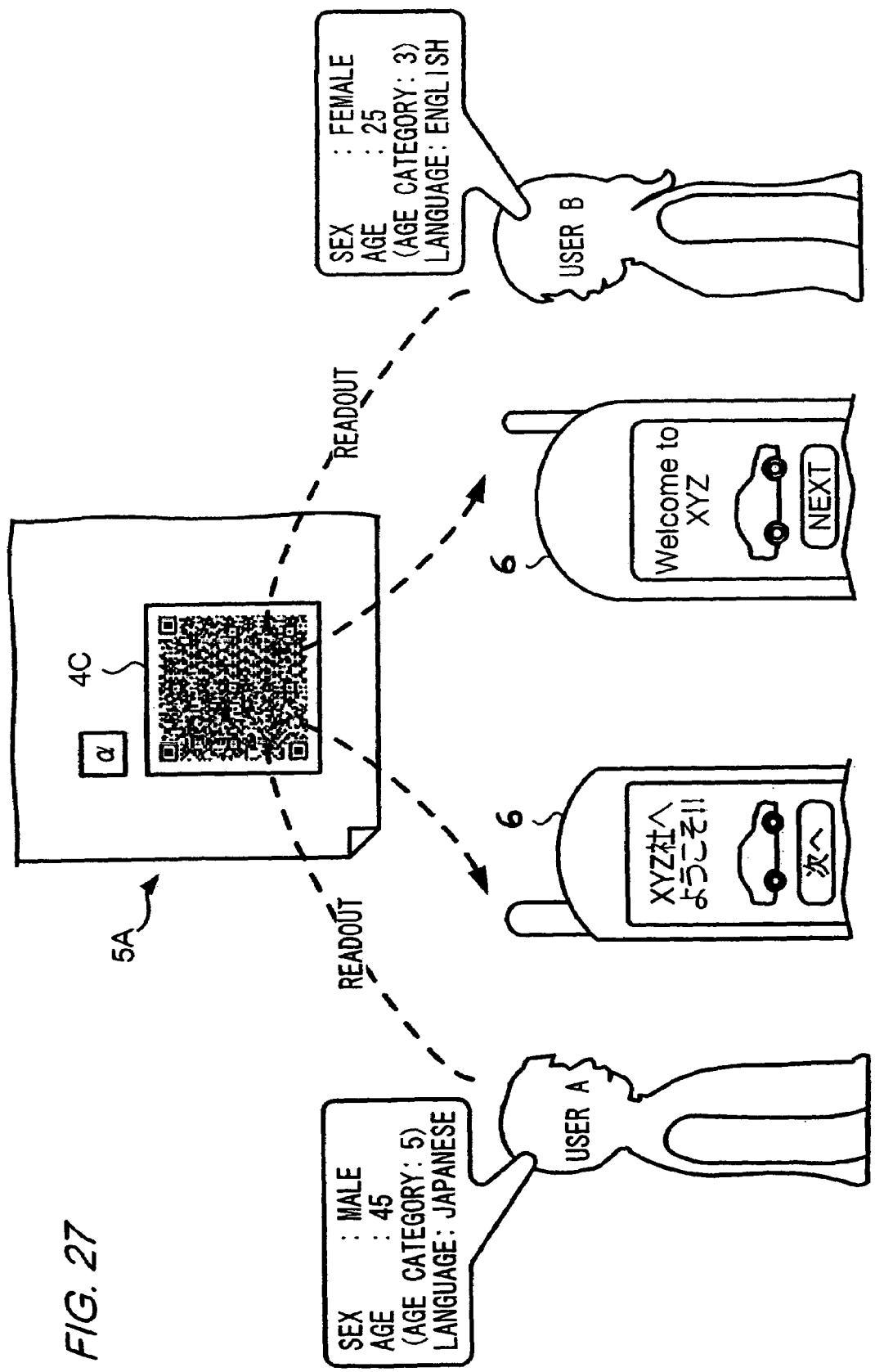
FIG. 27 is a diagram showing an overview of the system.

Operation of the above-described embodiment will now be discussed with reference to FIGS. 27 and 29. In FIG. 27, an enlarged diagram is shown of a barcode 4C printed on poster 5A. FIG. 27 also shows a user A using a first mobile station 6 and a user B using a second mobile station 6. In this example, the script data contains a plurality of URLs (three URLs shown in FIG. 26) for different languages. In the illustrated embodiment user B speaks English, and therefore, he/she wishes to obtain information in English. User B is interested by poster 5A and wishes to obtain more detailed information on an automobile advertised there on. First, the user checks whether or not his/her mobile station is compatible with the particular barcode by looking at the indicators "α", "β", "γ" at the bottom of the poster 5A. In this example, it is assumed that the second mobile station 6 supports the encoding method "α". The user thus identifies that the barcode 4C directly below the sign "α" is for his/her mobile station.

The signs may represent a company (communication carrier) providing a mobile communication service for mobile stations that support a particular decoding method. A user sometimes does not know which decoding method his/her mobile station is compatible with, but he/she knows the communication carrier he/she uses.

Subsequently, the user B holds the mobile station adjacent to the barcode 4C to read the barcode (FIG. 29; Step S201). In accordance with FIG. 29 which corresponds to the trigger embedded in the barcode, the mobile station then executes a barcode processing program to perform a decoding process, thereby decoding script data and interpreting the decoded script data. (Step S202). The mobile station then determines whether a user attribute information reading instruction code or trigger is contained therein (Step S203). In this example, the script data contains only the above three URLs shown in FIG. 26 the mobile station determines whether only a single URL is contained in the script data If it is determined YES, the routine proceeds to Step S208, where the mobile station activates a browser program to send the URL to packet communication network 7. In this example, the above three URLs are extracted, and the routine proceeds to Step S207.

In Step S206, if it is determined that there is more than one URL in the script data the mobile station proceeds to step S207 and performs a process of selecting one of the extracted URLs. As previously described the three URL's correspond to the Japanese, English and Spanish languages respectively. The mobile station is normally programmed with a user preferred language. Accordingly, the trigger in the barcode will prompt the mobile station to automatically select the appropriate URL by matching the URL to the user preference stored in the mobile station. However, if no preferred language is specified or if the preferred language is not one of the three in the script data, for example, German, a default URL will be chosen. Where the above script data does not contain information designating a default URL, the mobile station displays all of the three URLs on display unit 205, thereby prompting the user B to select one of the displayed URLs. After one URL is thus selected, the mobile station activates a browser program and transmits the URL out to packet communication network 7 (Step S208).

In Step S207, the user B selects a URL "http://www.xyzcompany.com/EN" representing a web page where English information is written. The selected URL is then transmitted to packet communication network 7. As a result, as shown in FIG. 27, a web page showing information in English is displayed on display unit 205 of mobile station 6.

Languages supported in a web page are not limited to the above three languages, and any other language may be supported. Also, a web page corresponding to each language is not necessarily a translation of the same information. Where there is a difference in specifications between a Japanese car and a North American car, the English web page may post different information on the respective web pages. It is also possible to use a different background image for a web page depending on a linguistic area. FIG. 27 shows that the user A has his mobile station 6 displaying a Japanese web page "http://www.xyzcompany.com/JP" after decoding information obtained from the barcode 4C by following the same process followed by the user B.

Figure 29:
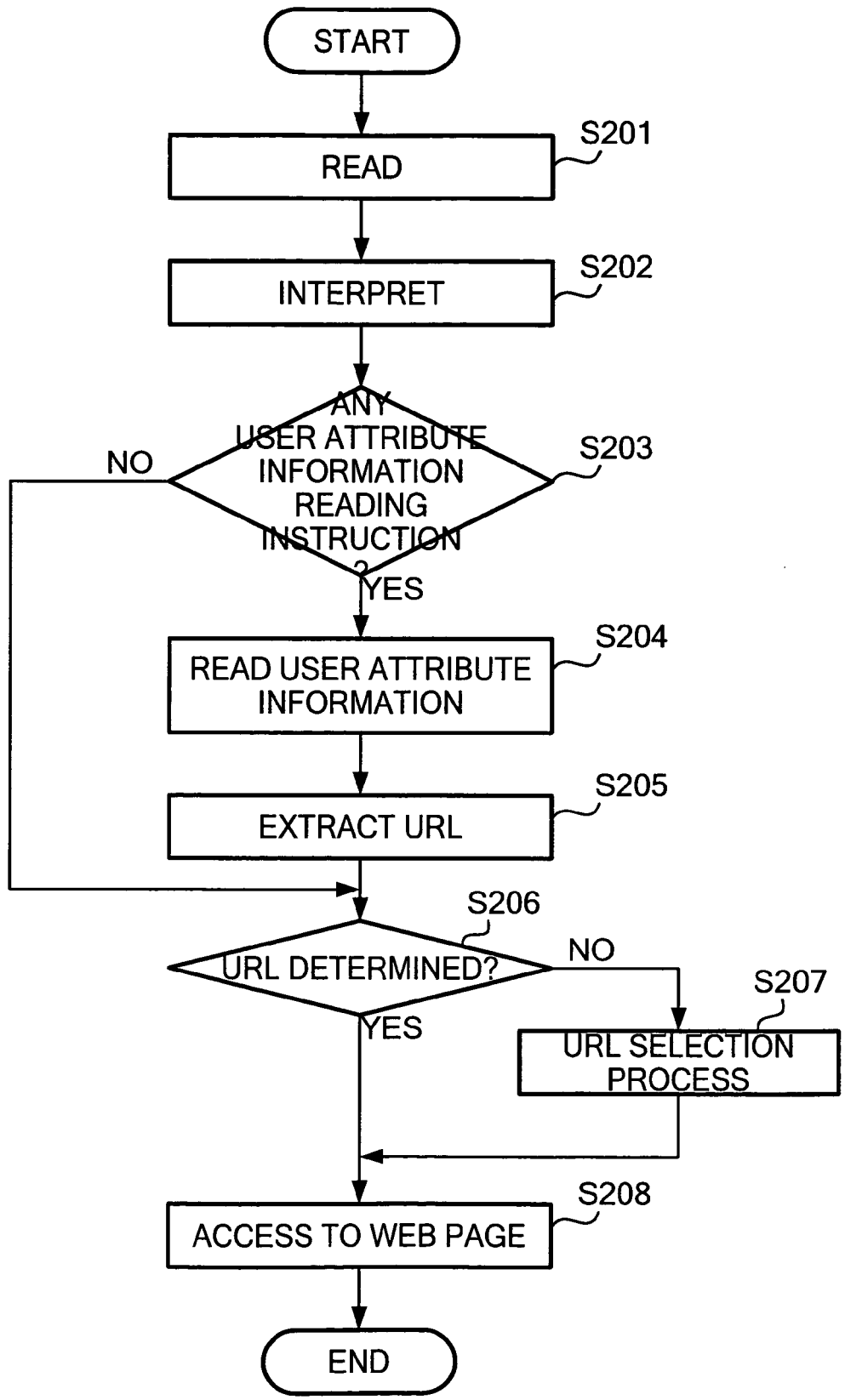
FIG. 29 is a flowchart showing an example operation.
Figure 29B:
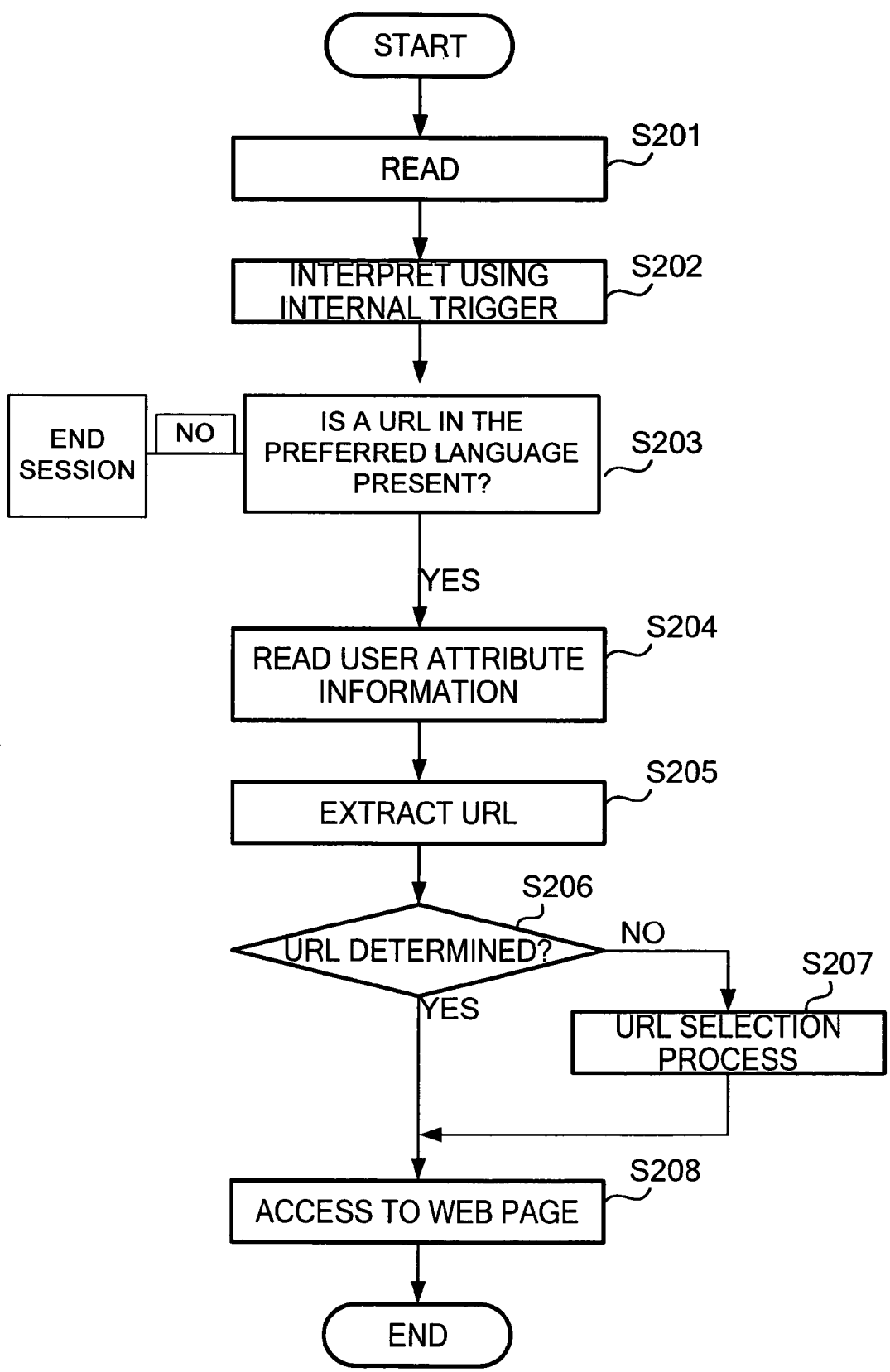
FIG. 29B is a flowchart showing an example operation.

In the above described process the trigger was contained in the barcode, however the invention is not limited in this regard as the trigger can also be contained in the mobile station as shown in FIG. 29B. When this is the case and at least two URL's are present in the script data, the mobile station will read both of the URL's and then make a determination as to whether a URL in the preferred language is present. If this is the case, then the mobile station will access the appropriate URL.

Next, description will be given of an example where the above script data contains a trigger to activate particular user attribute information stored in the mobile station. In this example, the automobile company has created a web page capable of displaying different types of content depending on a user's attribute (e.g. age or sex). For instance, the URL can be configured as follows; http/www.carcompany.com//male/40 or http/www.carcompany.com/male/20 or http/www.carcompany.com/female/20 or http/www.carcompany.com/female/40. Many other configurations are possible. When such a barcode containing the above identified types of URL's is encountered user attribute information stored in the mobile station for such things as age, sex, and language of a user is triggered and the appropriate URL is automatically chosen.

In the following, a description will be given with reference to FIG. 29. After a user notices poster 5A, the operation up to Step S203 is the same as the above Example 1. Specifically, the process of reading a barcode and decoding script data and the process of interpreting the decoded script data to obtain a URL(s) and various instruction codes are the same as those of Example 1 (Steps S201-S202). In the present example, unlike the above Example 1, a user attribute information reading instruction code (hereinafter referred to as a "trigger") is included in the script data (Step S203; Yes). Therefore, the mobile station reads user attribute information from nonvolatile memory 203 (Step S204). Then one or more URLs that match(es) the read user attribute information is extracted (Step S205).

The routine then proceeds to Step S206. Where, in Step S205, more than one URL is extracted and no matching URL is found, or there is no attribute data stored (Step S206; No), the same process of selecting a URL as Example 1 is performed (Step S207). Where no URL is extracted that matches any of the user preferences or no information for designating a default URL is contained in the script data, the mobile station displays all of the extracted URL's and the user can select one or the mobile station may be programmed to select the default URL contained in the script data.

Figures 30, 33, 34:
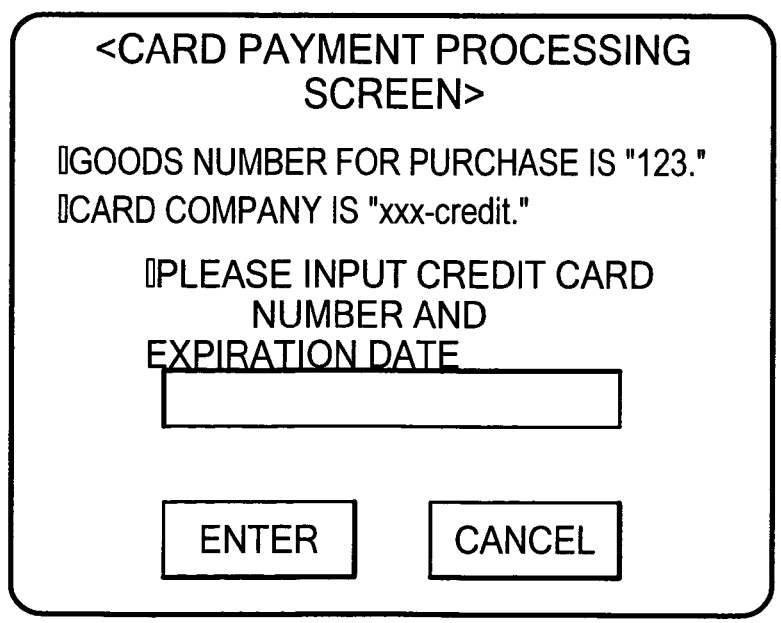
FIG. 30 is an example diagram showing an extracted URL.
FIG. 33 is an example diagram showing an extracted URL.
FIG. 34 is an example diagram of a payment processing screen.

The determination of Step S203 may be performed, for example, by checking whether a particular portion of a character string comprising a URL matches one or more of the user attribute information. More specifically, the user attribute information has an "age" field, a "sex" field, and a "language" field. For example, in FIG. 27, in each of those fields for the user A, "3" indicating an age of twenty, "f" indicating female. In this case, a URL such as shown in FIG. 30 is extracted. It should be noted that the format of the URL in FIG. 30 is exemplary only and may be modified or appear in differing formats.

Figure 31:
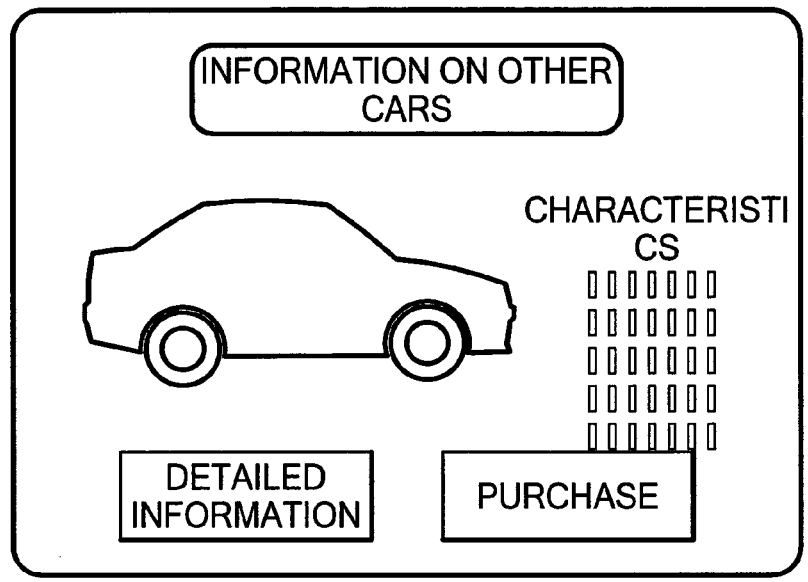
FIG. 31 is an example diagram showing a web page.

FIG. 31 is an example of a web page presenting a car, which web page is designated in the URL shown in FIG. 30. Since the user B of the mobile station is a female, the web page presents, for example, a photograph of a car which is most popular among female drivers. It is also possible to display the photograph of the car in a warm color that is likely to be preferred by female drivers. In a web page for youngsters, a flashy page may be created whereas, in a page for seniors, characters may be displayed in a larger size for an improved readability.

In the web page, links may be provided leading the user to other pages. The user is able to view another page providing more detailed specifications of the car by selecting the link. It may also be possible to access a page for purchase of the car.

"Information on other cars" displayed on the same web page is a link to a page corresponding to the user attribute information. Specifically, the web server is able to know the user's age group based on a URL to which an access is made. In cases where the user is in his/her twenties, it is possible to provide a link to a web page displaying a list of cars that are popular among people in that age group.

Thus, according to the present embodiment, a user only has to have his/her portable terminal read a barcode, thereby URL information matching his/her own attribute is automatically acquired. Accessing this acquired URL, the user is able to view desired information on a web page. In other words, a user does not have to input his/her own attribute information, search for or specify a web page that matches the attributes, the user's convenience is considerably improved. Further, using poster 5A and the mobile station 6, an advertiser is able to provide a user with user-attribute dependent information from a web page, with information on poster 5A being a starting point. While the above described embodiment references the trigger being contained in the script data of the barcode, the invention is not limited in this regard as the trigger can be stored in the mobile station instead. In this manner the mobile station reads all of the script data and the trigger stored in the mobile station causes the appropriate selections to be made.

Fourth Embodiment

A system according to the present embodiment is a system for on-line shopping for everyday items and other goods. The system according to the third embodiment is applied to the system of the present embodiment. Web server device 9 is managed by an on-line shop; and a user of a mobile station 6 accesses web server device 9 using the mobile station 6 to view a web page. The user, while viewing the web page, selects goods to purchase, and performs a payment operation to purchase the goods.

Figure 32:
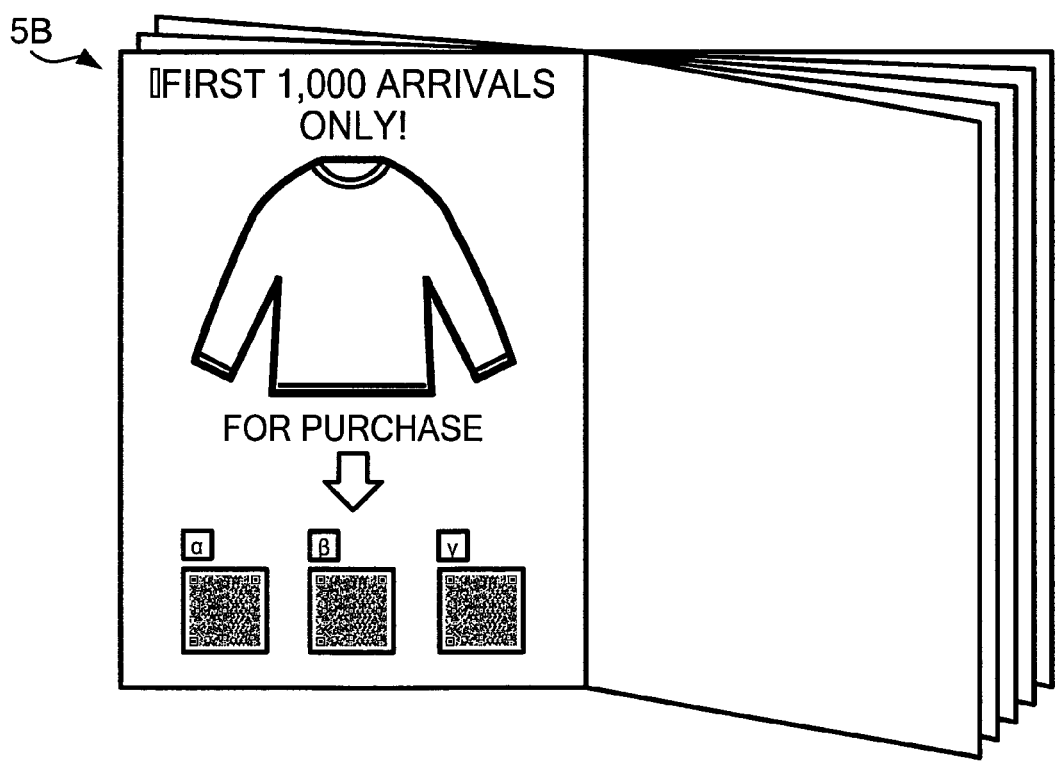
FIG. 32 is an example diagram showing a page of a catalog according to a fourth embodiment of the present invention.

In the embodiment, an operator of an on-line shop (hereinafter will be referred to as "on-line shop"), distributes, to potential customers, their product catalog in advance. FIG. 32 shows an example of one page of the catalog. In the page, an advertisement on T-shirts has been printed, where a limited number of the T-shirts are for sale.

Barcode

A barcode according to the present embodiment contains script data containing a plurality of URLs and a trigger. Each of the URLs contained in the script data includes an alphanumeric indicator used by the on-line shop for identifying the T-shirts (hereinafter referred to as "goods information"), an identifier for identifying a plurality of types of credit cards, debit cards, and/or cash cards (hereinafter referred to as a "card type identifier"), and an identifier for identifying a language (e.g., English, Japanese, Spanish, etc.) used by a user of the mobile station 6 (hereinafter referred to as a "language identifier"). The trigger is a code which instructs the mobile station to read information, from among user attribute information, that corresponds to a preferred language and information regarding a card type. The card type identifier serves to specify a credit or other payment card to be used in the system because a user generally owns a plurality of different cards and uses the cards depending on a selected purchasing method or the amount of purchase. For Example, when the card type is a credit card, a selection may for example, be made from Visa®, MasterCard®) or American Express®. While the above described embodiment references the trigger being contained in the script data of the barcode, the invention is not limited in this regard as the trigger can be stored in the mobile station instead. In this manner the mobile station reads all of the script data and the trigger stored in the mobile station causes the appropriate selections to be made.

A mobile station 6 according to the present embodiment stores, as user attribute information, an identifier specifying a type of a credit card selected by its user to be used for payment in addition to age, sex, and a language used.

As shown in FIG. 29 a user who wishes to purchase the T-shirts uses his/her own mobile station 6 to decode script data read from a barcode, and interpret the script data for execution (Steps S201 and S202, S203; Y). When the routine proceeds to Step S204, the mobile station reads user attribute information, namely, language used and card type information. Subsequently, the mobile station 6 extracts, among a plurality of URLs contained in the script data, a URL that matches the type of the card and the language that has been read in Step S204 (Step S205). Where the more that one or none of the extracted URL's matches the user attribute information (Step S206; No, and Step S207), the same URL selection process as described in the third embodiment may be performed. FIG. 33 is an example of a thus extracted URL. In this example, the language preferred by the user is Japanese; the alphanumeric indicator of the T-shirts is "123"; and a card used by the user is "XXX-credit" company's card.

When one URL is thus determined, the mobile station 6 transmits the URL out to packet communication network 7 (Step S208). As a result, a payment screen for the Japanese user for "XXX-credit", as shown in FIG. 34, is displayed on a display unit 205. In this example, information on goods to be purchased is displayed on the screen. The user inputs a credit card number and an expiration date in the screen, whereby a purchase and payment process is completed.

Thus, unlike the third embodiment, the on-line shop does not have to make a user of the mobile station 6 view a page showing details of goods and a page for selecting the goods in the present embodiment, since the shop is able to know what goods the user wishes to purchase at the time when access is made to an extracted URL. Also, since information on a credit card type to be used is known to the shop when access is made to the URL, a payment screen for a card type to be used can be readily displayed even where different payment screens are adopted by different credit card types or companies and where a card type must be designated by a user in a conventional on-line shipping system. In the system according to the present embodiment, a user of the mobile station 6 is relieved from a troublesome operation of designating a credit card type; that is, a user only has to input a credit card number in the payment screen. Thus, a quick transaction is enabled, bringing improved convenience to both of the user and the on-line shop.

In a preferred mode of the present embodiment, a credit card number and its expiration date may be contained in user attribute information. In this case, a user only has to confirm the details of the purchase and the payment, bringing even more improved convenience to the user and the on-line shop.

In a case where the user wishes to continue with a purchase of other goods after the payment process above is completed, a page showing goods that match the acquired user attribute information may be displayed. For example, the on-line shop may acquire information on the user's hobby in addition to the credit card type information. When the user's hobby turns out to be "skiing", a page showing a list of skiing goods may be automatically displayed when no operation input is made by the user for a prescribed period of time.

Modifications to the Third and the Fourth Embodiments:

In the above third and fourth embodiments, user attribute information is stored in the mobile station 6; but the storage location of user attribute information is not limited thereto. For example, where script data is decoded from a barcode, and the mobile station, based on the script data, requests for user attribute information, the mobile station may request, via packet communication network 7, a service subscriber's server (not shown) owned by a communication carrier providing a mobile communication service to transmit user attribute information of the user.

The content (items of information) registered as user attribute information may be freely set by a user of the mobile station 6. For example, information relating to a credit card could be a type of information which the user may not wish to be transferred to an operator of a web page due to security concern. In such a case, the credit card number is set so as not to be included in user attribute information. Also, it is also possible to prohibit the barcode processing program from reading user attribute information even when certain information is contained in user attribute information. Alternatively, a user may register, in the mobile station 6, trusted advertisers in advance and when a barcode contains information regarding the identity of an advertiser, the barcode processing program may be designed so as to compare the identify of the advertiser with that of the reregistered trusted advertisers to determine whether to use user attribute information for the purpose of extracting a URL.

It is also possible to pre-program basic attribute information (e.g. a language used) in nonvolatile memory 203 of the mobile station 6., therefore when a mobile station 6 is purchased by a user or when the mobile station 6 is shipped from a vendor it will already contain basic user attribute information. Also, it may be set to prohibit a user from rewriting basic and important attribute information.

While the present invention has been shown and described as being limited in application to two-dimensional barcodes, it is not limited in this regard and may find application with regard to any type of barcode, or to a displayed object containing information whose attributes are not visually identifiable. Moreover, while description of the invention has been provided in the foregoing embodiments, it will be obvious that the invention is in no way limited to the foregoing description, and that the scope of the invention extends to any modification that does not depart from the essential variety of modifications that are conceivable which would not depart from the essential characteristics of the present invention.

What is claimed is:

1. A mobile station comprising:
   a detector for sensing information contained within a two-dimensional barcode:
   a decoder for decoding said sensed information;
   a screen for displaying said sensed and decoded information;
   said sensed information including the same information in a plurality of different forms;
   a selector for preferentially determining which of said plurality of different forms will be displayed on said screen; and wherein
   said mobile station includes a trigger programmed therein for prompting said selector to preferentially determine which of said plurality of different forms will be displayed on said screen.

2. A mobile station as defined by claim 1 wherein said mobile station includes at least one user attribute information programmed therein.

3. A mobile station as defined by claim 1 wherein said selector employs said at least one user attribute information to aid in preferentially determining which of said plurality of different forms will be displayed on said screen.

4. A mobile station as defined by claim 1 further including a telephone function.

5. A mobile station as defined by claim 1 further including a web browsing function.

6. A mobile station as defined by claim 1 further including a data exchange function.

7. A method for producing a display containing a two-dimensional barcode comprising the steps of: determining information to be contained within said two-dimensional barcode; generating said two-dimensional barcode having said information defined thereby; generating an indicator identifying an attribute of said two-dimensional barcode; and producing a display containing said two-dimensional barcode and said indicator positioned adjacent to said two-dimensional barcode.

8. A method as defined by claim 7 wherein said step of producing a display includes producing a documentary display.

9. A method as defined by claim 7 wherein said step of producing a display includes producing an electronic display.

10. A method as defined by claim 7 wherein said step of producing a display includes producing a display such that said two-dimensional barcode is readable by a mobile station.

11. A method as defined by claim 7 wherein said step of generating said two-dimensional barcode includes providing the same information in at least two different formats.

12. A method for using a mobile station to read and display information related to a two-dimensional barcode, said method comprising the steps of: providing a mobile station having a detector for sensing information contained within a two-dimensional barcode; decoder for decoding said sensed information; and a screen for displaying said sensed and decoded information; presenting a display that contains said two-dimensional barcode and an indicator located adjacent to said barcode that identifies an attribute thereof; reviewing said indicator to determine whether or not said mobile station is compatible with said two-dimensional barcode; detecting said two-dimensional barcode; decoding information defined by said two-dimensional barcode; and displaying said detected and decoded information.

13. A method as defined by claim 12 wherein said step of presenting a display includes providing a trigger embedded in said two-dimensional barcode for prompting said mobile station to decode information detected thereby.

14. A method as defined by claim 12 wherein said mobile station further includes a trigger programmed therein for prompting said mobile station to decode information detected thereby.

15. A method as defined by claim 12 wherein said two dimensional barcode includes the same information in at least two different formats; and said step of decoding further includes selecting one of said at least two different formats.

16. A method as defined by claim 12 comprising the additional step of causing said mobile station to communicate with a server having stored therein a plurality of URL's matchable with URL's contained within said two-dimensional barcode and also matchable with user preferences stored in said mobile station.

17. A mobile station comprising:
- detector means for sensing information contained within a two-dimensional barcode;
- decoder means for interpreting said sensed information;
- a screen means for displaying said sensed and decoded information;
- said sensed information including the same information in a plurality of different forms;
- selector means for preferentially determining which of said plurality of different forms will be displayed on said screen;
- trigger means for prompting said selector means to preferentially determine which of said plurality of different forms will be displayed on said screen.

18. A method for using a mobile station to read and display information related to a two-dimensional barcode, said method comprising the steps of: providing a mobile station having detecting means for sensing information contained within a two-dimensional barcode; decoder means for interpreting said sensed information; and screen means for displaying said sensed and decoded information; presenting a display that contains said two-dimensional barcode and indicator means located adjacent to said barcode for identifying an attribute thereof; reviewing said indicator means to determine whether or not said mobile station is compatible with said two-dimensional barcode; detecting said two-dimensional barcode; decoding information defined by said two-dimensional barcode; and displaying said detected and decoded information.

19. A system for obtaining content information from a barcode, said system comprising: a display having at least one two-dimensional barcode shown thereon; and at least one indicator identifying an attribute of said two dimensional barcode also shown on said display adjacent to said two-dimensional barcode, a mobile station having a detector for reading and decoding script data embodied in said two-dimensional barcode, and at least two descriptors one of which is displayed by said mobile station.

20. A system as defined by claim 19 wherein one of said barcode and said mobile station includes a trigger for prompting said mobile station to attempt to display one of said at least two descriptors.

21. A system as defined by claim 19 wherein said at least two descriptors are URL's.

22. A system as defined by claim 19 wherein said at least two descriptors each contain the same information but in different languages.

* * * * *